United States Patent
Tokita et al.

(10) Patent No.: US 7,495,831 B2
(45) Date of Patent: Feb. 24, 2009

(54) OPTICAL DEVICE, DISPLAY DEVICE, AND THREE-DIMENSION IMAGE DISPLAY DEVICE FOR CHANGING A POLARIZATION STATE OF A LIGHT BEAM IN TIME

(75) Inventors: Toshiaki Tokita, Kanagawa (JP); Kazuhiro Fujita, Tokyo (JP); Toshiharu Murai, Kanagawa (JP); Atsushi Takaura, Tokyo (JP); Kazuya Miyagaki, Kanagawa (JP); Takanobu Osaka, Kanagawa (JP); Yasuyuki Takiguchi, Kanagawa (JP); Hiroyuki Sugimoto, Kanagawa (JP); Yumi Matsuki, Kanagawa (JP); Yukiko Hirano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 161 days.

(21) Appl. No.: 11/206,205

(22) Filed: Aug. 18, 2005

(65) Prior Publication Data

US 2006/0039068 A1 Feb. 23, 2006

(30) Foreign Application Priority Data

Aug. 20, 2004 (JP) ............................. 2004-240237
Feb. 24, 2005 (JP) ............................. 2005-048403

(51) Int. Cl.
*G02B 5/30* (2006.01)
*G02B 27/28* (2006.01)
*G02B 26/08* (2006.01)
*G02B 26/02* (2006.01)
*G03B 21/14* (2006.01)
*F21V 9/14* (2006.01)

(52) U.S. Cl. .................. 359/497; 359/501; 359/209; 359/236; 353/20; 362/19

(58) Field of Classification Search ................ 359/485, 359/489, 494, 495, 497, 502, 196–226, 234–236, 359/501; 353/20; 362/19
See application file for complete search history.

(56) References Cited

U.S. PATENT DOCUMENTS 2,478,891 A * 8/1949 Bernier ...................... 352/62

(Continued)

FOREIGN PATENT DOCUMENTS

JP 8-68963 3/1996

(Continued)

OTHER PUBLICATIONS

U.S. Appl. No. 11/684,742, filed Mar. 12, 2007, Hirano et al.

(Continued)

*Primary Examiner*—Amel C Lavarias
*Assistant Examiner*—Jennifer L. Doak
(74) *Attorney, Agent, or Firm*—Oblon, Spivak, McClelland, Maier & Neustadt, P.C.

(57) ABSTRACT

An optical element, an optical device, and a display device are disclosed that are able to change a polarization state in time order and to produce polarized light with little wavelength dependence and superior in polarization purity, and able to perform pixel shift easily and accurately to realize high resolution image display. The optical element has a translucent surface parallel to the rotational axis of the optical element, and at least a portion of the translucent surface is formed from an optically anisotropic medium. A polarization state of a light beam transmitting through the translucent surface is switched in time order along with rotation of the optical element.

34 Claims, 21 Drawing Sheets

U.S. PATENT DOCUMENTS

| | | | | |
|---|---|---|---|---|
| 2,866,375 | A | * 12/1958 | Hopkins et al. | 250/225 |
| 4,544,247 | A | * 10/1985 | Ohno et al. | 352/62 |
| 5,101,296 | A | * 3/1992 | Bell | 359/489 |
| 5,863,125 | A | * 1/1999 | Doany | 353/84 |
| 5,907,438 | A | 5/1999 | Fujita et al. | |
| 6,181,473 | B1 | 1/2001 | Fujita et al. | |
| 6,491,396 | B2 | * 12/2002 | Karasawa et al. | 353/20 |
| 6,497,488 | B1 | 12/2002 | Yamauchi et al. | |
| 6,520,644 | B1 | * 2/2003 | Lee | 353/31 |
| 6,866,404 | B2 | 3/2005 | Yamauchi et al. | |
| 6,905,211 | B2 | 6/2005 | Fujita et al. | |
| 6,919,982 | B2 | 7/2005 | Nimura et al. | |
| 2003/0098945 | A1 | 5/2003 | Sugimoto et al. | |
| 2003/0222980 | A1 | 12/2003 | Miyagaki et al. | |
| 2004/0021811 | A1 | 2/2004 | Matsuki et al. | |
| 2004/0036829 | A1 | 2/2004 | Sugimoto et al. | |
| 2004/0156117 | A1 | 8/2004 | Takaura et al. | |
| 2004/0213133 | A1 | 10/2004 | Funato et al. | |
| 2004/0263968 | A1 | 12/2004 | Kobayashi et al. | |
| 2005/0111072 | A1 | 5/2005 | Miyagaki et al. | |
| 2005/0128435 | A1 | 6/2005 | Yamauchi et al. | |
| 2006/0039068 | A1 | 2/2006 | Tokita et al. | |

FOREIGN PATENT DOCUMENTS

| | | |
|---|---|---|
| JP | 2908300 | 4/1999 |
| JP | 3352100 | 9/2002 |
| JP | 2002-328402 | 11/2002 |
| JP | 2003-098504 | 4/2003 |
| JP | 2004-70365 | 3/2004 |

OTHER PUBLICATIONS

U.S. Appl. No. 11/409,059, filed Apr. 24, 2006, Sugimoto et al.

* cited by examiner

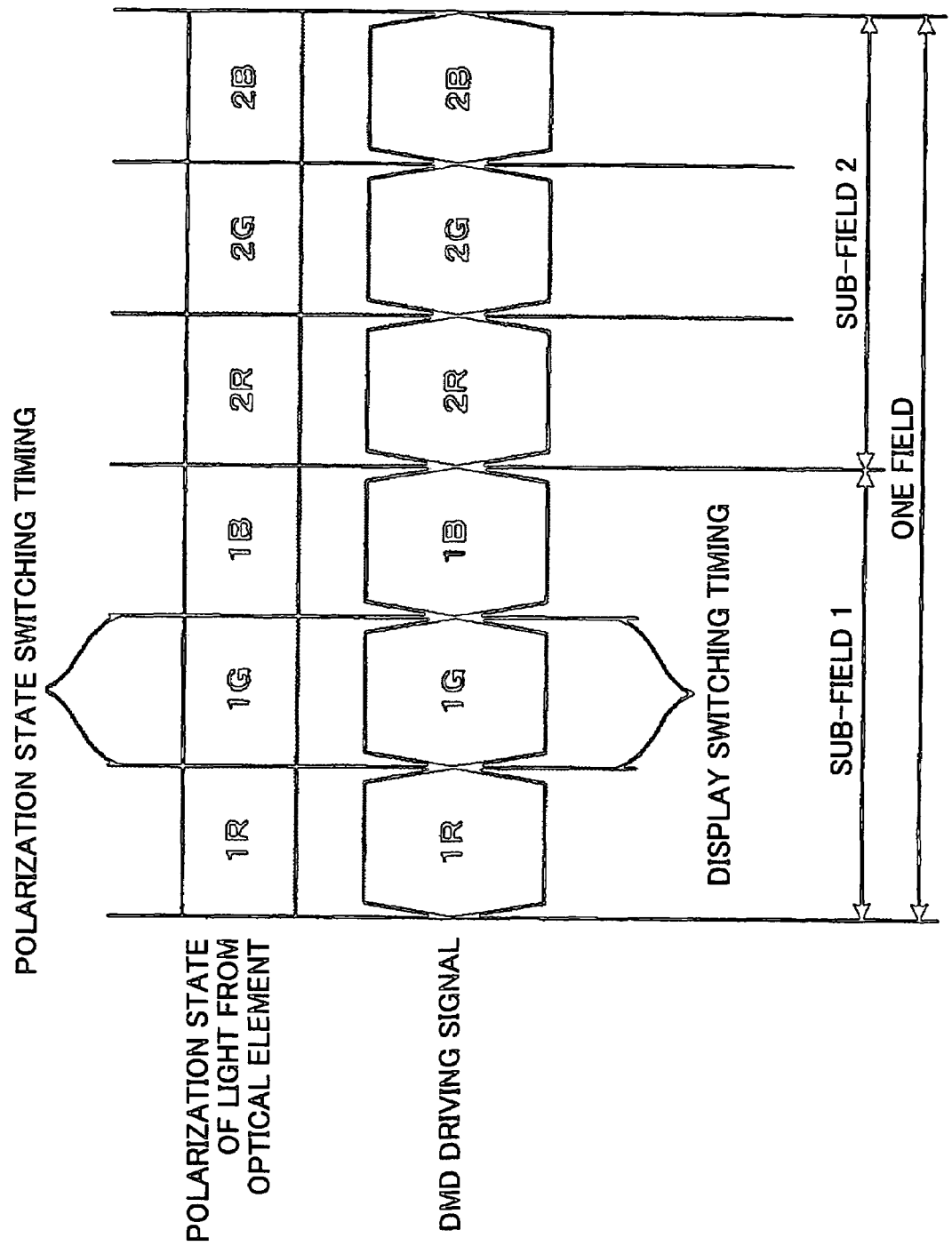

OPTICAL DEVICE, DISPLAY DEVICE, AND THREE-DIMENSION IMAGE DISPLAY DEVICE FOR CHANGING A POLARIZATION STATE OF A LIGHT BEAM IN TIME

BACKGROUND OF THE INVENTION

1. Field of the Invention

The present invention relates to an optical element, an optical element, a display device, and a three-dimension image display device, and more particularly, to a technique employed by a projection display device, especially, a projection display device using a digital micro-mirror device (abbreviated to be "DMD") for increasing the resolution of the projection display device.

2. Description of the Related Art

In a so-called "pixel shift technique", a pixel shift element is used to display image patterns, with display positions of them being shifted by using an optical deflection element in response to deflection of the light path in each sub-field, and thereby, the number of pixels of image display units appears to be doubled. The pixel shift element includes plural image display units arranged two-dimensionally and being controllable according to image information, a light source that emits light to illuminate the image display units, an optical device for observing the image patterns displayed on the image display units, and the aforesaid optical deflection element that deflects the light path from the image display units to optical elements in each sub field. Here, the sub fields are divisions of an image field in time order.

In the following descriptions, by "polarization direction of linear-polarized light", it means an oscillation direction of the electric filed vector of the linear-polarized light.

In the pixel shift technique of the related art, the image display units or the optical elements of a projecting optical system are allowed to oscillate, alternatively, liquid crystal optical deflection elements are utilized. In the pixel shift technique, which involves oscillation of the image display units or the optical elements, because mechanical oscillation occurs at the same time, durability of the image display units or the optical elements is degraded, and heat or noise is generated. In contrast, the pixel shift technique employing liquid crystal optical deflection elements is superior in mechanical reliability, but if liquid crystal alignment is not sufficient, the contrast of images can be degraded, and due to this, cost of each display element may increase.

Meanwhile, development is being made of a projection display device using a DMD. The projection display device using a DMD includes a device that enables color image display by means of field sequential coloring with a color wheel. Below, detailed descriptions are made with reference to drawings.

FIG. 34 is a diagram illustrating a configuration of a projection display device in the related art.

As illustrated in FIG. 34, the projection display device includes a lamp unit 1, a color wheel 2, a lens 3, a rod integrator 4, a condenser lens 5, a DMD 6, and a projection lens 7.

The lamp unit 1 includes a white light source, such as a high-pressure mercury lamp, or a xenon lamp.

FIG. 35 is a diagram illustrating the composition of the light beam emitted from the lamp unit 1.

As illustrated in FIG. 35, the light beam from the lamp unit 1 has red, blue, and green compositions.

When the light beam from the lamp unit 1 passes through the color wheel 2, the light beam is decomposed into a red light beam, a blue light beam, and a green light beam sequentially. The light beam from the color wheel 2 passes through the lens 3, and is directed to the rod integrator 4, which adjusts the intensity uniformity of the light beam. The light beam passes through the condenser lens 5 and is directed to the DMD 6. The DMD 6 is an image display unit in which micro-mirrors, which serve as pixels, are arranged two-dimensionally. According to the image signal corresponding to each pixel, the orientation (such as angle) of each corresponding micro-mirror is adjusted so as to adjust the time length of reflecting the light beam to the projection lens 7, and the time length of reflecting the light beam to other directions to obtain desired brightness at each pixel.

For example, Japanese Laid-Open Patent Application No. 2004-070365 (hereinafter, referred to as "reference 1") discloses a technique, which is similar to the pixel shift technique, for high resolution and smooth images with the DMD by allowing the DMD or the optical elements of the projecting optical system to oscillate.

Japanese Patent Gazette No. 3352100 (hereinafter, referred to as "reference 2") proposes to use a rotating prism in a display device, in which the rotating prism is used to shift plural color light bands (light stripes from an illumination system) in an image display unit to improve light utilization efficiency when a single-plate display unit is used to display color images.

Japanese Laid-Open Patent Application No. 8-068963 (hereinafter, referred to as "reference 3") and Japanese Laid-Open Patent Application No. 9-159971 (hereinafter, referred to as "reference 4") disclose a technique related to a three-dimension image display system. In the three-dimension image display system proposed in the reference 3, a polarized light beam splitter is used to split the light beam from a light source into an S polarized-light component and a P polarized-light component, and the S and P polarized-light components are incident on liquid crystal panels for the right eye and left eye of a viewer, respectively, and are projected on a screen.

In the three-dimension image display system proposed in the reference 4, a polarization adjusting element is provided in front of a lenticular screen to change the polarization direction in time order, and a polarization plate series, which includes polarization filters perpendicular to each other and arranged like a stripe, is used as the lenticular screen.

However, because mechanical oscillation occurs in the display device proposed in the reference 1, durability of the image display units or the optical elements is degraded, and heat or noise is generated.

The display device proposed in the reference 2 is effective for display color images, but it cannot change the polarization direction, hence, it cannot increase the resolution of the DMD.

In the display device proposed in the reference 3, because two groups of image display units and projection lenses have to be prepared corresponding to the right eye and the left eye, the size of the display device is large.

In the display device proposed in the reference 4, because the light beam has to pass through the polarization adjusting element, the quality of image is degraded; in addition, because the light intensity is largely reduced in the polarization plate series, the light utilization efficiency is low.

SUMMARY OF THE INVENTION

It is a general object of the present invention to solve one or more of the problems of the related art.

A more specific object of the present invention is to provide an optical element and an optical device able to change a polarization state in time order and to produce polarized light with little wavelength dependence and superior in polarization purity, a display device able to perform pixel shift easily and accurately to display a high resolution image, and a three-dimension image display device able to be made compact and to display a three-dimension image with good quality.

Another more specific object of the present invention is to provide an optical element, an optical device, and a display device superior in light utilization efficiency.

According to a first aspect of the present invention, there is provided an optical element having a rotational axis, comprising: a translucent surface parallel to the rotational axis, at least a portion of the translucent surface being formed from an optically anisotropic medium, wherein a polarization state of a light beam transmitting through the translucent surface is switched in time order along with rotation of the optical element.

According to the present invention, it is possible to produce polarized light with little wavelength dependence and superior in polarization purity, in comparison with the polarization conversion method of the related art which uses a liquid crystal or others. In addition, by combining the optically anisotropic medium, it is possible to switch the propagation direction of the light periodically, thereby, it is possible to apply pixel shift easily and accurately, and to realize high-resolution image projection display.

As an embodiment, the optical element includes a polygonal prism which has the rotational axis and the translucent surface parallel to the rotational axis, and at least a portion of a side surface of the polygonal prism is formed from the optically anisotropic medium.

According to the present invention, because the optically anisotropic medium is formed on a plane, it is possible to homogenize the polarization state within a specified unit period when the polarization state is switched in time order, and it facilitates aberration design for both convergent light and focused light, and allows adoption of a multiplayer structure.

As an embodiment, the optical element includes a cylinder which has the rotational axis and the translucent surface parallel to the rotational axis, and at least a portion of the side surface of the cylinder is formed from the optically anisotropic medium.

According to the present invention, it is possible to eliminate variation of the light path with time when the polarization state is switched in time order.

As an embodiment, the optically anisotropic medium may include polarizers arranged at predetermined intervals along a rotational direction of the optical element.

According to the present invention, with a non-polarized incident light beam, it is possible to obtain a linear-polarized light beam with the polarization state varying with time, hence, it is possible to simplify the optical system and reduce the size of the device.

In addition, in the embodiment, the polarizers produce outgoing light beams having different polarization directions.

According to the present invention, it is possible to simplify the optical system and reduce the size of the device.

Further, in the embodiment, two types of polarizers are arranged along the rotational direction of the optical element, and the two types of polarizers produce light beams having perpendicular polarization directions.

According to the present invention, it is possible to apply pixel shift easily and accurately when using the digital micro-mirror device.

As an embodiment, in the optical element, the optically anisotropic medium includes ½ wave plates arranged at predetermined intervals along a rotational direction of the optical element.

According to the present invention, with a linear-polarized incident light beam, it is possible to produce a linear-polarized light beam with the polarization state varying with time.

In addition, in the embodiment, an optically isotropic medium is provided between each two neighboring ½ wave plates, and the optical path length in the optically isotropic medium is equal to an optical path length in each of the ½ wave plates with respect to an incident light beam transmitting through the ½ wave plates.

According to the present invention, it is possible to prevent aberration cased by disagreement of the light paths, and eliminate a variation with time of a luminous distribution when using the optical element as an illumination unit of a digital micro-mirror device.

In addition, in the embodiment, an optically isotropic medium is provided between each two neighboring ½ wave plates, and the transmittance of the optically isotropic medium is equal to the transmittance of each of the ½ wave plates relative to an incident light beam transmitting through the ½ wave plates.

According to the present invention, it is possible to prevent the variation with time of the transmittance, and eliminates the variation with time of the light intensity when using the optical element as an illumination unit of a digital micro-mirror device.

As an embodiment, the optically anisotropic medium includes plural ¼ wave plates arranged at predetermined intervals along a rotational direction of the optical element.

According to the present invention, it is possible to homogenize wavelength dispersion of the outgoing light beam.

In the embodiment, ¼ wave plates having different phase directions are arranged alternately along the rotational direction of the optical element.

According to the present invention, with a circular-polarized incident light beam, it is possible to produce a linear-polarized light beam with the polarization direction thereof being switched between two perpendicular directions.

As an embodiment, plural color filters are arranged along a rotational direction of the optical element, and at least one of the color filters serves as the optically anisotropic medium.

According to the present invention, it is possible to switch both the polarization state and the color in time order, and this can reduce the size of the device.

In the embodiment, the color filters include at least a Red (R) filter, a Blue (B) filter, and a Green (G) filter, and in each rotation cycle of the optical element, the color filters produce polarized light having one of two perpendicular polarization states for each color and totally at least six polarization states.

According to the present invention, while light of three colors for display is obtained, polarization switching can be performed for high resolution display, and with the pixel shift technique, in one rotation cycle of the optical element, the pixels are shifted to be at two positions to obtain a double resolution.

In the embodiment, neighboring polarization states among the six polarization states correspond to different colors.

According to the present invention, it is possible to prevent the color breakup effect.

In addition, as an embodiment, the color filters include a Red (R) filter, a first Green (G) filter, a Blue (B) filter, and a second Green (G) filter, and in each rotation cycle, each of the first green filter and the second green filter produces polarized light beams having polarization directions perpendicular to each other.

According to the present invention, while light for display is obtained, polarization switching can be performed for high resolution display; further, because only the polarization state of the green light is varied, there are four changes of the polarization states, and it is possible to extend to the period of the polarization state by 1.5 times, thus, increasing the light utilization efficiency when the optical element is used in a projection display device.

In the embodiment, each of the red and blue polarized light beams has a polarization direction parallel to the polarization direction of one of the green polarized light beams.

According to the present invention, in addition to green light, the red and blue light is also linear-polarized, and this prevents occurrence of a double image, thus it is possible to provide an image display device superior in resolution when display fine lines.

In addition, in the embodiment, the transmittance of the red filter and the blue filter is greater than the transmittance of the first green filter and the second green filter.

Because the light transmits through the green filters twice, the intensity of the green light is doubled. According to the present invention, by increasing the transmittance of the red filter and the blue filter relative to the green filters, it is possible to obtain good color matching, thus it is possible to provide a projection image of high resolution and superior in color reproduction.

In addition, in the embodiment, the width of the red filter and the blue filter along the rotational direction is greater than the width of the first green filter and the second green filter.

Because the light transmits through the green filters twice, the intensity of the green light is doubled. According to the present invention, by increasing the width of the red filter and the blue filter relative to the green filters, the time is increased of transmitting through the red filter and the blue filter, thereby, it is possible to obtain good color matching, thus it is possible to provide an projection image of high resolution and superior in color reproduction.

According to a second aspect of the present invention, there is provided an optical device comprising at least one optical element that includes a translucent surface parallel to a rotational axis of the optical element with at least a portion of the translucent surface being formed from an optically anisotropic medium, wherein a light beam is incident on the optical element at a predetermined direction, and a light beam having a polarization state different from the incident light beam is emitted out, the polarization state of the outgoing light beam being switched in time order along with rotation of the optical element.

According to the present invention, it is possible to provide an optical device able to change a polarization state in time order with high precision.

As an embodiment, an optical axis of the incident light beam passing through the optically anisotropic medium is perpendicular to the rotation axis of the optical element.

According to the present invention, it is possible to obtain an outgoing light beam having a well-defined polarization state, and when the optical device is applied to pixel shift in a projection device, it is possible to prevent occurrence of double images at the pixel shift positions, and obtain an image of high quality.

As an embodiment, a straight line including an optical axis of the incident light beam transmitting through the optically anisotropic medium intersects with the rotation axis of the optical element.

According to the present invention, it is possible to obtain an outgoing light beam having a well-defined polarization state, and when the optical device is applied to pixel shift in a projection device, it is possible to prevent occurrence of double images at the pixel shift positions, and obtain an image of high quality.

As an embodiment, the light beam incident on the optically anisotropic medium is a converged light beam, and a convergence point is on the optically anisotropic medium.

According to the present invention, it is possible to reduce the diameter of the light spot through the optically anisotropic medium, and hence reduce the size of the device.

As an embodiment, when the incident light beam transmits through the optical element, the incident light beam transmits through the translucent surface with the optically anisotropic medium formed thereon only once.

According to the present invention, it is possible to prevent degradation of the polarization state when the incident light beam transmits through the translucent surface more than once.

In the embodiment, a mirror is fixed in the optical element on an optical path length of the light beam passing through the optically anisotropic medium.

According to the present invention, it is possible to implement the optical device with an extremely simple structure.

Further, in the embodiment, a propagation direction of the light beam in the optical element is along a direction from the mirror to the optically anisotropic medium.

According to the present invention, after switching the polarization state, the mirror is able to avoid degradation of the polarization state, and to prevent occurrence of a double image due to degradation of the polarization state.

As an embodiment, the optically anisotropic medium includes ½ wave plates arranged at predetermined intervals along a rotational direction of the optical element; and the light beam incident on the optical element is a linear-polarized light beam.

According to the present invention, with ½ wave plates and a linear-polarized incident light beam, it is possible to produce a linear-polarized light beam with the polarization state varying with time.

As an embodiment, when the incident light beam transmits through the optical element, the incident light beam transmits through the translucent surface with the optically anisotropic medium formed thereon twice.

According to the present invention, before and after the incident light beam transmits through the optical element, the optical axis is along a common straight line, and this facilitates optical design, adjustment.

As an embodiment, the optically anisotropic medium includes polarizers arranged at predetermined intervals along a rotational direction of the optical element; and the light beam incident on the optical element is a non-polarized light beam.

According to the present invention, the structure of the device is simple by allowing incidence of the non-polarized light.

As an embodiment, the optically anisotropic medium includes ¼ wave plates arranged at predetermined intervals along a rotational direction of the optical element; and the light beam incident on the optical element is a linear-polarized light beam.

According to the present invention, a linear-polarized light beam is obtained from a non-polarized light beam by the polarization conversion technique at a front stage of the device, and is emitted to the optical device, thus, it is possible to increase light utilization efficiency of the device.

As an embodiment, the outgoing light beam having a temporally switched polarization state is a linear-polarized light beam having one of two perpendicular polarization states.

According to the present invention, when the optical device is applied to pixel shift in a projection device, it is possible to prevent occurrence of double images at the pixel shift positions, and obtain an image of high quality.

According to a third aspect of the present invention, there is provided a display device comprising an optical device including at least one optical element which includes a translucent surface parallel to a rotational axis of the optical element with at least a portion of the translucent surface being formed from an optically anisotropic medium, wherein a light beam is incident on the optical element at a predetermined direction, and a light beam having a polarization state different from the incident light beam is emitted out, said polarization state of the outgoing light beam being switched in time order along with rotation of the optical element.

According to the present invention, because the incident light beam is controlled on the illumination side, compared to the pixel shift technique of the related art which allows oscillation of the image display units or the optical elements of a projecting optical system, or, utilizes liquid crystal optical deflection elements, there is no load imposed on the image display unit, and no increment of back focus of the projection optical system, and it is possible to perform pixel shift satisfactorily.

As an embodiment, the display device further comprises a digital micro-mirror device.

According to the present invention, it is possible to perform pixel shift simply and accurately.

In the embodiment, the optical device is arranged on an illuminating side of the digital micro-mirror device.

According to the present invention, it is possible to shorten the back focus of the projection optical system, and to avoid image skewness due to the planarity of the mirror if the optical device is provided on the projection optical system side.

As an embodiment, the light beam emitted from the optical element in the optical device is incident on the digital micro-mirror device with a polarization state of the light beam being in time order switched; and a polarization direction of the light beam incident on the digital micro-mirror device is perpendicular to or parallel to a diagonal direction of pixels of the digital micro-mirror device.

According to the present invention, it is possible to shift a pixel to compensate for a space among four neighboring pixels, and thus, it is possible to obtain a high resolution efficiently.

As an embodiment, the light beam emitted from the optical element in the optical device is incident on the digital micro-mirror device with a polarization state of the light beam being switched in time order; and a polarization direction of the light beam incident on the digital micro-mirror device is perpendicular to or parallel to a side direction of pixels of the digital micro-mirror device.

According to the present invention, it is possible to shift a pixel to compensate for a space between neighboring scanning lines in the vertical direction and horizontal direction, and thus, it is possible to obtain a high resolution efficiently.

As an embodiment, a birefringent element is provided on an outgoing side of the digital micro-mirror device, the birefringent element having an optical axis inclined relative to an optical axis of the digital micro-mirror device.

According to the present invention, it is possible to switch the propagation direction of the light periodically.

In the embodiment, the light beam emitted from the optical element in the optical device is incident on the birefringent element with a polarization state of the light beam being switched in time order; and a polarization direction of the light beam incident on the birefringent element is perpendicular to or parallel to a plane including the optical axis of the birefringent element and the optical axis of the digital micro-mirror device.

According to the present invention, there is no double image, and it is possible to switch the propagation direction of the light periodically.

In the embodiment, when the polarization direction of the light beam incident on the birefringent element is parallel to the plane including the optical axis of the birefringent element and the optical axis of the digital micro-mirror device, deflection of the light beam caused by birefringence equals half of a pitch of a pixel matrix in the digital micro-mirror device along the polarization direction.

According to the present invention, by shifting the light beam by half of a pitch of a pixel matrix, it is possible to obtain images of high resolution.

As an embodiment, a display switching timing of the digital micro-mirror device is in synchronization with the polarization state switching timing in the optical element of the optical device.

According to the present invention, it is possible to prevent occurrence of a double image caused by timing mismatch, and to obtain an image of a high resolution.

According to a fourth aspect of the present invention, there is provided a three-dimension image display device comprising a display device and a polarization selection unit having polarization filters arranged corresponding to the left eye and the right eye of a viewer, respectively, said polarization filters having a transmission axis in agreement with a polarization direction of a linear-polarized light beam emitted from the display device.

The display device includes a digital micro-mirror device, and an optical device arranged on an illuminating side of the digital micro-mirror device and having at least one optical element. The optical element has a translucent surface parallel to a rotational axis of the optical element with at least a portion of the translucent surface being formed from an optically anisotropic medium.

In the optical device, a light beam is incident on the optical element at a predetermined direction, and a light beam having a polarization state different from the incident light beam is emitted out with the polarization state of the outgoing light beam being switched in time order along with rotation of the optical element.

According to the present invention, it is possible to produce polarized light with little wavelength dependence and superior in polarization purity and to form a three-dimension image of high quality. In addition, because the optical element is provided in the illumination system, it is possible to prevent an increment of the back focus of the projection optical system, and it is possible to make the device compact. Consequently, it is possible to reduce the cost, or reduce the thickness of a rear projection-type display device, reduce the number of optical element parts in the projection system, and improve the image quality. Further, it is easy to design the projection optical system because it is not necessary to use additional components to form the three-dimension image.

As an embodiment, the polarization selection unit is in form of glasses, and the polarization filters are arranged corresponding to the glasses for the left eye and the right eye, respectively.

According to the present invention, regardless of the position of the viewer, the viewer can observe the three-dimension image of good quality.

As an embodiment, when the digital micro-mirror device is displaying an image for the right eye or the left eye, the polarization direction of the light beam is adjusted so that a linear-polarized light beam arrives at the viewer, said linear-polarized light beam being parallel to the transmission axis of one of the polarization filters arranged at a right eye position or a left eye position of the polarization selection unit.

According to the present invention, it is possible to form the three-dimension image of good quality.

According to a fifth aspect of the present invention, there is provided an optical element having a rotational axis and comprising a translucent surface parallel to the rotational axis, plural optically anisotropic media being formed on the translucent surface along a rotational direction of the optical element, each of said optically anisotropic media only allowing a predetermined light beam having a predetermined color and a predetermined linear polarization direction to pass through, and reflecting light beams other than the predetermined linear-polarized light, wherein a light beam outgoing from each of the optically anisotropic media is allowed to have one of at least two colors and to have one of at least two polarization directions, and the color and the polarization direction of the light beam outgoing from the optically anisotropic media is switched in time order along with rotation of the optical element.

According to the present invention, because the reflected light can be re-used, it is possible to increase light utilization efficiency.

According to a sixth aspect of the present invention, there is provided an optical device, comprising: a light source having a reflecting plate; a homogenization unit that homogenizes a luminous distribution of light emitted from the light source; and an optical element that has a translucent surface parallel to a rotational axis of the optical element with plural optically anisotropic media being formed on the translucent surface along a rotational direction of the optical element, each of the optically anisotropic media only allowing a predetermined light beam having a predetermined color and a predetermined linear polarization direction to pass through, and reflecting light beams other than the predetermined light beam, a light beam outgoing from each of the optically anisotropic media being allowed to have one of at least two predetermined colors and one of at least two predetermined polarization directions, and the color and the polarization direction of the light beam outgoing from each of the optically anisotropic media being switched in time order, wherein light reflected from one of the optically anisotropic media of the optical element passes through the homogenization unit, reflected again by the reflecting plate of the light source, and arrives at another one of the optically anisotropic media.

According to the present invention, it is possible to prevent the reflected light from being stray light, and to increase light utilization efficiency.

As an embodiment, the homogenization unit includes a Kleidoscope rod integrator, and an exit window thereof is inside the optical element.

According to the present invention, it is possible to shorten the distance to the optical element, and allow uniform illumination, and further to reduce the size and cost of the device.

As an embodiment, the homogenization unit includes a Kleidoscope rod integrator, and a phase shifter is provided on an inner side of an incidence window thereof.

According to the present invention, it is possible to homogenize a luminous distribution of the linear-polarized light beam perpendicular to the light beam reflected from the optical element, and to reduce light intensity fluctuation.

As an embodiment, a light beam passing through the optical element transmits through at least two of the optically anisotropic media, alternatively, the light beam transmitting through the optical element includes red, green, and blue colors at the same time.

According to the present invention, by providing respective transmission areas, it is possible to utilize the white light efficiently.

According to a seventh aspect of the present invention, there is provided a display device, comprising an optical device that includes a light source having a reflecting plate; a homogenization unit that homogenizes a luminous distribution of light emitted from the light source; and an optical element that has comprises a translucent surface parallel to a rotational axis of optical element, a plurality of optically anisotropic media being formed on the translucent surface along a rotational direction of the optical element, each of said optically anisotropic media allowing a predetermined linear-polarized light beam having a predetermined color and a predetermined polarization direction only to pass through, and reflecting light beams other than the predetermined linear-polarized light, a light beam outgoing from each of the optically anisotropic media being allowed to have one of at least two predetermined colors and one of at least two predetermined polarization directions, and the color and the polarization direction of the light beam outgoing from each of the optically anisotropic media being switched in time order; wherein light reflected from one of the optically anisotropic media of the optical element passes through the homogenization unit, reflected again by the reflecting plate of the light source, and arrives at another one of the optically anisotropic media; an image display unit; a relay lens that forms an image on the image display unit; and a projection lens that projects light from the image display unit to a screen, wherein a light beam having a predetermined color and a predetermined linear polarization direction scans and illuminates the image display unit along with rotation of the optical element for displaying an image.

According to the present invention, it is possible to provide a display device of high light utilization efficiency and a high resolution.

As an embodiment, a birefringent element is provided between the projection lens and the image display unit, said birefringent element having an optical axis inclined relative to an optical axis of the optical element, and a polarization state of the light beam incident on the birefringent element is switched in time order between a perpendicular state and a parallel state relative to a plane including the optical axis of the birefringent element and the optical axis of the optical element.

According to the present invention, it is possible to provide a display device of high light utilization efficiency and a high resolution without increasing the number of parts compared to the device of the related art.

According to a seventh aspect of the present invention, there is provided a three-dimension image display device, comprising a display device that includes an optical device having a light source comprising a reflecting plate; a homogenization unit that homogenizes a luminous distribution of light emitted from the light source; and an optical element that has comprises a translucent surface parallel to a rotational axis of optical element, a plurality of optically anisotropic media being formed on the translucent surface along a rotational direction of the optical element, each of said optically anisotropic media allowing a predetermined linear-polarized light beam having a predetermined color and a predetermined polarization direction only to pass through, and reflecting light beams other than the predetermined linear-polarized light, a light beam outgoing from each of the optically anisotropic media being allowed to have one of at least two predetermined colors and one of at least two predetermined polarization directions, and the color and the polarization direction of the light beam outgoing from each of the optically anisotropic media being switched in time order; wherein light reflected from one of the optically anisotropic media of the optical element passes through the homogenization unit, reflected again by the reflecting plate of the light source, and arrives at another one of the optically anisotropic media; an image display unit; a relay lens that forms an image on the image display unit; and a projection lens that projects light from the image display unit to a screen, wherein a light beam having a predetermined color and a predetermined linear polarization direction scans and illuminates the image display unit along with rotation of the optical element for displaying an image; and a polarization selection unit that has polarization filters arranged corresponding to a left eye and a right eye of a viewer, respectively, each of said polarization filters having a transmission axis in agreement with a polarization direction of a linear-polarized light beam emitted from the display device.

According to the present invention, it is possible to produce polarized light with little wavelength dependence and superior in polarization purity and to form a three-dimension image of high quality. In addition, because the optical element is provided in the illumination system, it is possible to prevent an increment of the back focus of the projection optical system, and it is possible to make the device compact. Consequently, it is possible to reduce the cost, or reduce the thickness of a rear-projection-type display device, reduce the number of optical element parts in the projection system, and improve the image quality. Further, it is easy to design the projection optical system because it is not necessary to use additional components to form the three-dimension image.

As an embodiment, the polarization selection unit is in form of glasses, and the polarization filters are arranged corresponding to the glasses for the left eye and the right eye.

According to the present invention, regardless of the position of a viewer, the viewer can observe the three-dimension image of good quality.

These and other objects, features, and advantages of the present invention will become more apparent from the following detailed description of preferred embodiments given with reference to the accompanying drawings.

BRIEF DESCRIPTION OF THE DRAWINGS

FIG. 17 shows a time chart exemplifying a DMD driving signal and time allocation within one field of a polarization state in the optical device of the present embodiment;

FIG. 23 is a cross sectional view of an optical element using two color-polarization filters which different light beams transmit through;

DESCRIPTION OF THE PREFERRED EMBODIMENTS

Below, preferred embodiments of the present invention are explained with reference to the accompanying drawings.

First Embodiment

Figure 1:
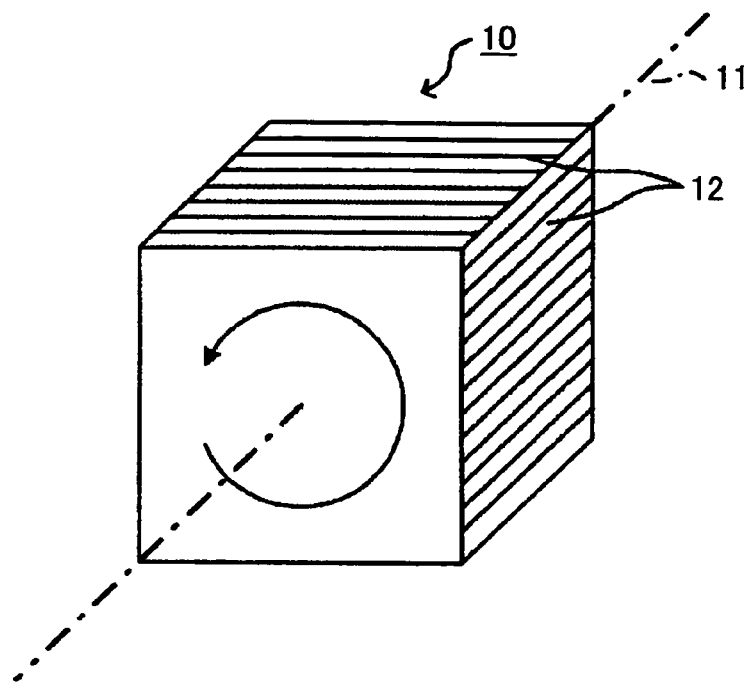
FIG. 1 is a perspective view of an optical element according to a first embodiment of the present invention.

FIG. 1 is a perspective view of an optical element according to a first embodiment of the present invention.

As illustrated in FIG. 1, an optical element 10 is formed from a quadrangular prism having a rotational axis 11 and four side surfaces 12. The four side surfaces 12 of the quadrangular prism are translucent and are parallel to the rotational axis 11. At least a portion of the surfaces 12 is formed from an optically anisotropic medium which switches, in time order, a polarization state of a light beam transmitting through the surfaces 12 along with rotation of the optical element 10, and emits the light beam.

Figure 2:
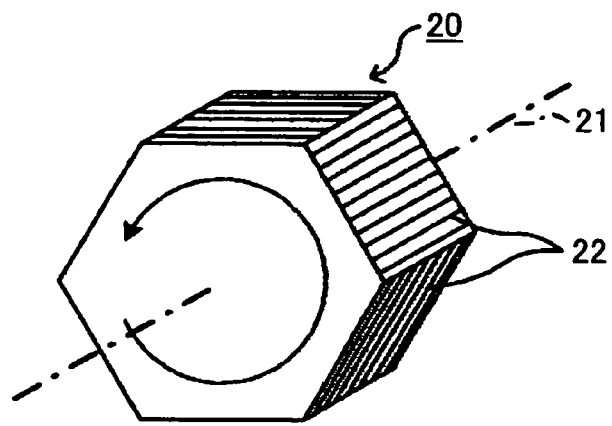
FIG. 2 is a perspective view of another example of the optical element according to the present embodiment of the present invention.

FIG. 2 is a perspective view of another example of the optical element according to the present embodiment of the present invention.

As illustrated in FIG. 2, an optical element 20 is formed from a hexagonal prism having a rotational axis 21 and six side surfaces 22. The six side surfaces 22 of the hexagonal prism are translucent and are parallel to the rotational axis 21. At least a portion of the surfaces 22 is formed from an optically anisotropic medium which switches, in time order, a polarization state of a light beam transmitting through the surfaces 22 along with rotation of the optical element 20, and emits the light beam.

Of course, the optical element of the present embodiment is not limited to the quadrangular prism and the hexagonal prism, but can be a polygonal prism, and the optically anisotropic medium can be formed on a side surface of the polygonal prism.

In FIG. 1 and FIG. 2, the rotational axes 11 and 21 are specified to be the symmetric axis of the quadrangular prism and the hexagonal prism. But the optical element of the present embodiment is not limited to this.

Figure 3:
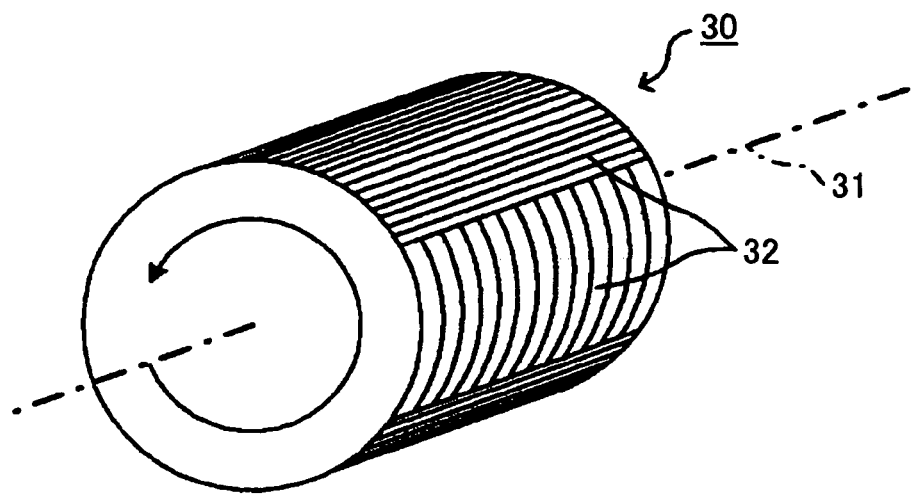
FIG. 3 is a perspective view of another example of the optical element according to the present embodiment of the present invention.

FIG. 3 is a perspective view of another example of the optical element according to the present embodiment of the present invention.

As illustrated in FIG. 3, an optical element 30 is formed from a cylinder having a rotational axis 31 and a side surface 32. The side surface 32 of the cylinder is translucent. An optically anisotropic medium is formed on at least a portion of the side surface 32.

For example, the optical element 30 can be formed in the following way. A frame can be formed first with a metal or a resin with areas through which light is to transmit being open, and the edge of the optically anisotropic medium is stuck to frame. Hence, the optical element 30 can be formed.

Alternatively, the optical element 30 can be formed in the following way. With glass, a transparent resin, or an optically isotropic transparent medium as a base material, the optically anisotropic medium is printed on the above material, or a film of the optically anisotropic medium is formed on the above material in vacuum.

The optically anisotropic media in the above examples may be a polarizer which allows a light beam having a predetermined polarization direction to transmit, but cuts light of other polarization directions, or a phase shifter which generates differences in the propagation speeds of light beams depending on the polarization directions of the light beams. Particularly, the phase shifter may be a ½ wave plate which generates a phase difference equivalent to ½ of the wavelength between an incident light beam and an outgoing light beam, or a ¼ wave plate which generates a phase difference equivalent to ¼ of the wavelength between the incident light beam and the outgoing light beam. It is preferable that the optically anisotropic medium in the above examples have uniform performance over the visible light region, but it is more preferable that the optically anisotropic medium has good performance in the green region. Many common materials used as optical parts can be used, for example, polyvinyl alcohol, polypropylene, polyethylene, polycarbonate, polyallylate, polysulphone, polyolefin, and so on can be stretched to make these materials optically anisotropic, and such materials can be used as the optically anisotropic medium.

In the examples as shown in FIG. 1 and FIG. 2, for example, the polarizers on different side surfaces of the quadrangular prism or the hexagonal prism may have different polarization direction, thereby, it is possible to control the polarization direction with each side surface.

In the example shown in FIG. 3, the polarizers can be arranged on the side surface 32 at certain intervals along the rotational direction of the optical element 30 to control the polarization direction.

Alternatively, in pixel shift using a DMD, because it is necessary that the polarization direction be switched between two perpendicular polarization directions, it is preferable that two types of polarizers, which produce light beams having perpendicular polarization directions, be arranged alternately along the rotational direction of the optical element.

In either of the above two configurations, it is preferable that wavelength characteristics of the outgoing light beam from the polarizer be uniform. For example, the two types of polarizers same with each other may be placed perpendicular to each other.

Figure 4:
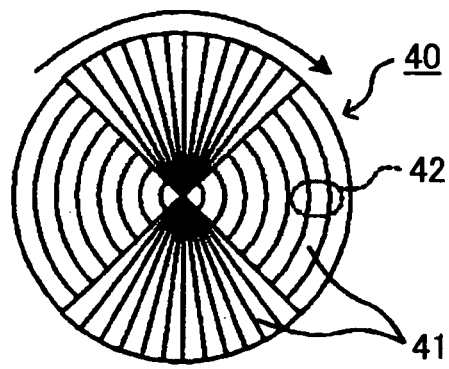
FIG. 4 is a diagram exemplifying an arrangement of the polarizers.

FIG. 4 is a diagram exemplifying an arrangement of the polarizers.

As illustrated in FIG. 4, the polarizers are placed on a surface 41 of a transparent circular plate, and when the circular plate is rotated, the polarization state of the incident light beam is switched in time order.

However, with the arrangement of the polarizers as illustrated in FIG. 4, it is difficult to obtain a directionally uniform linear-polarized light beam throughout the light transmission region 42.

Figure 5:
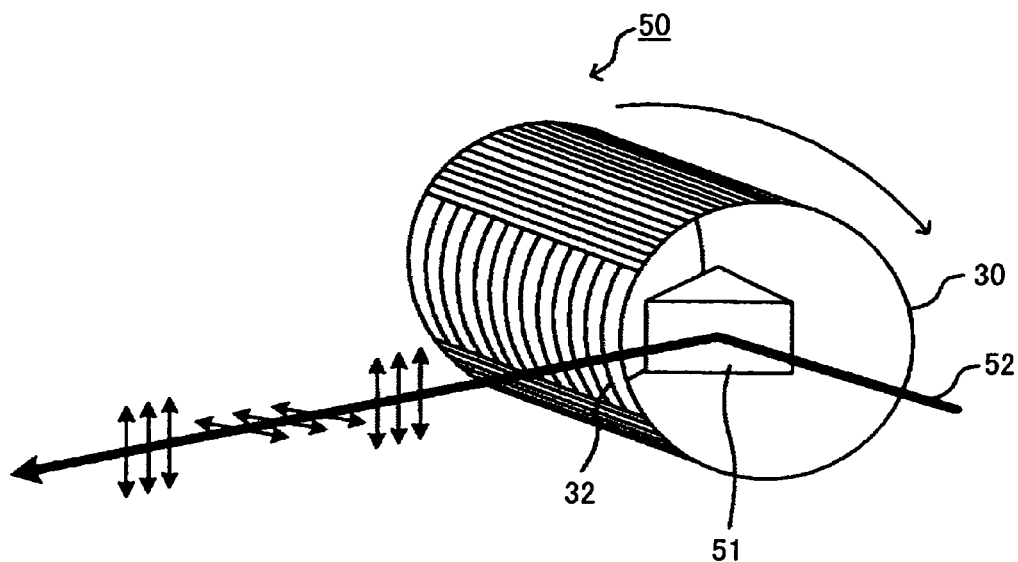
FIG. 5 is a perspective view of another example of the optical device according to the present embodiment of the present invention.

FIG. 5 is a perspective view of another example of the optical device according to the present embodiment of the present invention.

An optical device 50 is illustrated in FIG. 5, which is formed by placing a mirror 51 inside the optical element 30 as shown in FIG. 3 on the optical path length of the light transmitting the optically anisotropic medium. A light beam 52 transmits through the side surface 32 only once, on which the optically anisotropic medium is formed.

The optically anisotropic medium includes two polarizers which are perpendicular to each other. When the incident light beam is not polarized, as illustrated in FIG. 5, the polarized light beam is emitted with the polarization direction thereof being switched in time order between two directions perpendicular to each other.

Compared to FIG. 4, with the arrangement of the polarizers in FIG. 5, it is possible to obtain a directionally uniform linear-polarized light beam throughout the light transmission region 42.

In FIG. 5, a propagation direction of the light beam is set to be along a direction from the mirror 51 to the optically anisotropic medium. With this setting, also refer to FIG. 6, it is not necessary to provide a reflecting surface on the light path up to the DMD, and this prevents degradation of the polarization state originated from the surface precision of the reflecting surface.

Figure 6:
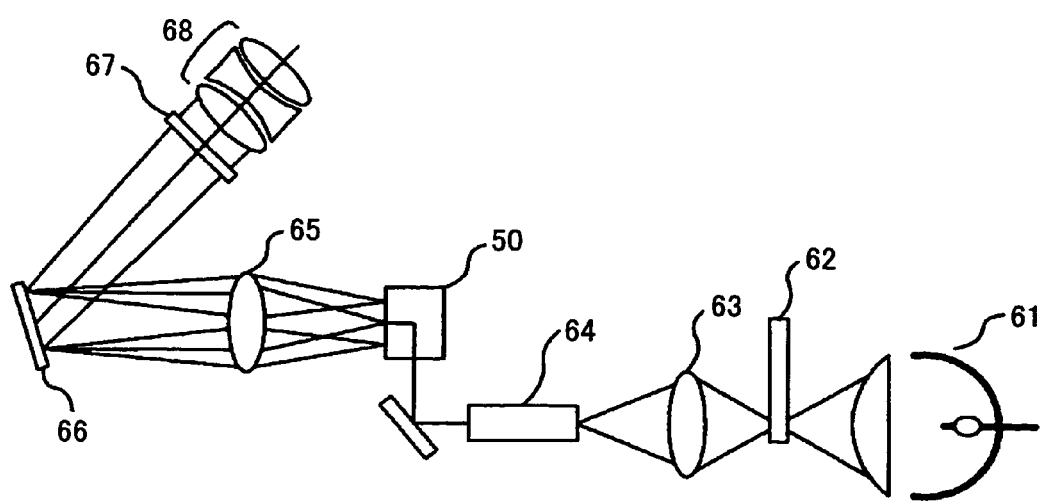
FIG. 6 is a diagram schematically illustrating a display device including the optical device 50.

FIG. 6 is a diagram schematically illustrating a display device including the optical device 50.

The display device illustrated in FIG. 6 includes a lamp unit 61, a color wheel 62, a lens 63, a rod integrator 64, the optical device 50 as described above, a condenser lens 65, a DMD 66, a birefringent element 67, and a projection lens 68.

The light beam from the lamp unit 61 is firstly condensed on the color wheel 62, and the light beam is decomposed into red, blue, and green light beams sequentially, and each color light beam is emitted. The light beam from the color wheel 62 passes through the lens 63, and is directed to the rod integrator 64, which homogenizes the intensity distribution of the light beam. The light beam passes through the rod integrator 64 is directed to the optical device 50 as described above. In each rotation cycle of the color wheel 62, the polarization state changes at the timing when the optical device 50 switches the polarization direction. Then, the light beam from the optical device 50 passes through the condenser lens 65 and is emitted to the DMD 66. In the DMD 66, the propagation direction of the incident light beam is adjusted by micro-mirrors, which serve as pixels. The light beam traveling towards the projection lens 68 transmits through the birefringent element 67, and with the birefringent element 67, it is possible to control a straight propagating light beam and a deflected light beam by a difference between the polarization state, and with these light beams, it is possible to obtain images of high resolution. Finally, the projection lens 68 projects the light beam onto a not-illustrated screen to display color images thereon.

Although the optical device 50 shown in FIG. 6 may be placed on the projection side of the DMD 66, because the back focus of the projection lens 68 becomes long, it is more preferable that the optical device 50 be placed on the illumination side of the DMD 66.

Figure 7:
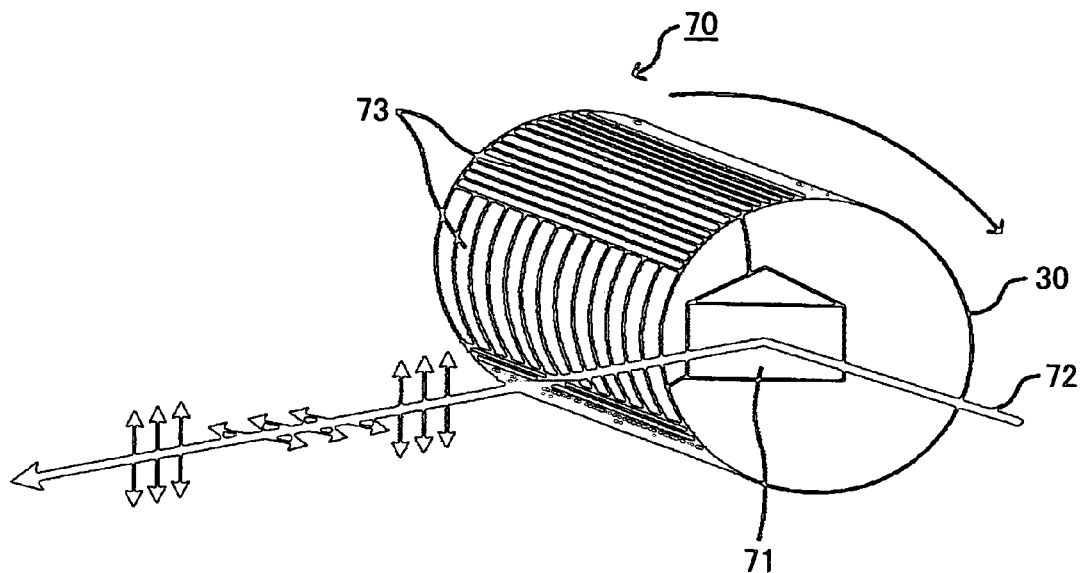
FIG. 7 is a perspective view exemplifying another example of the optical device according to the present embodiment of the present invention.

FIG. 7 is a perspective view exemplifying another example of the optical device according to the present embodiment of the present invention.

An optical device 70 is illustrated in FIG. 7, which is formed by placing color filters 73 on the optical element 30 along the rotation direction, and at least one of the color filters 73 serves as the optically anisotropic medium. With the optical device 70 described here, when a non-polarized light beam is incident, the optical device 70 produces an outgoing light beam with both of color and polarization state are switched in time order.

Figure 8:
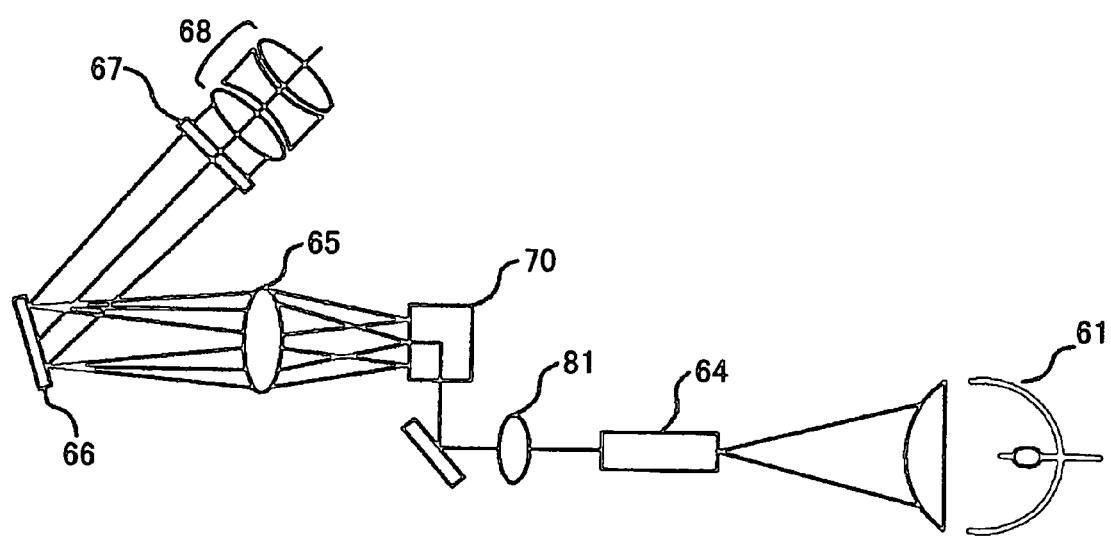
FIG. 8 is a diagram schematically illustrating a display device including the optical device 70.

FIG. 8 is a diagram schematically illustrating a display device including the optical device 70.

As illustrated in FIG. 8, with the optical device 70, even without the color wheel 62 in FIG. 6, the display device can realize the same functions as the display device in FIG. 6. Hence, it is possible to reduce the size and cost of the display device.

In FIG. 8, a relay lens 81 is placed after the rod integrator 64, which is set to be in a conjugate relation with the optically anisotropic medium on the optical device 70 and with the outgoing end of the rod integrator 64, and is a focus point of the light beam.

In FIG. 6 and FIG. 8, in order to obtain a good polarization state, it is preferable that the optical axis of the light beam passing through the optically anisotropic medium be perpendicular to the rotation axis of the optical element. It is more preferable that the straight line including the optical axis of the light beam transmitting through the optically anisotropic medium intersect with the rotation axis of the optical element. Further, the light beam incident on the optically anisotropic medium may be a converged light beam, and the convergence point may be on the optically anisotropic medium.

Next, two pixel shift modes are described below.

In the first pixel shift mode, each pixel has two shift positions (PS1, PS2), and the brightness at these shift positions corresponds to R, G, B color positions.

FIG. 9A through FIG. 9D illustrate the relation between the pixel shift positions and the R, G, B color positions.

Figure 9B:
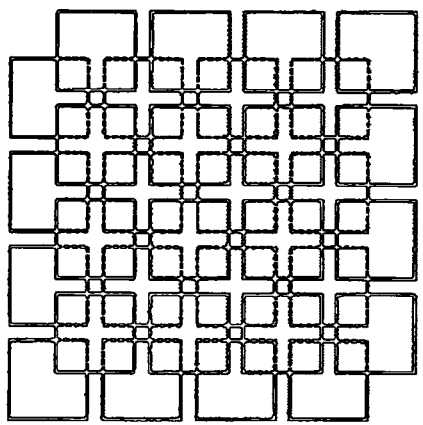
FIG. 9A through FIG. 9D illustrate the relation between the pixel shift positions and the R, G, B color positions.
Figure 9D:
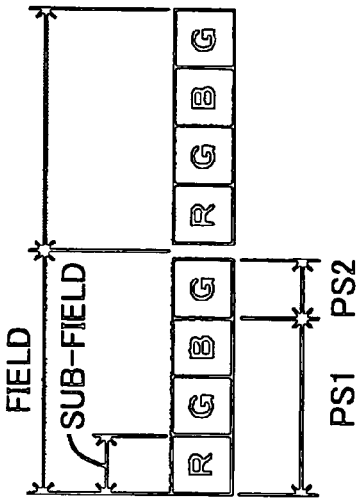
Figure 9A:
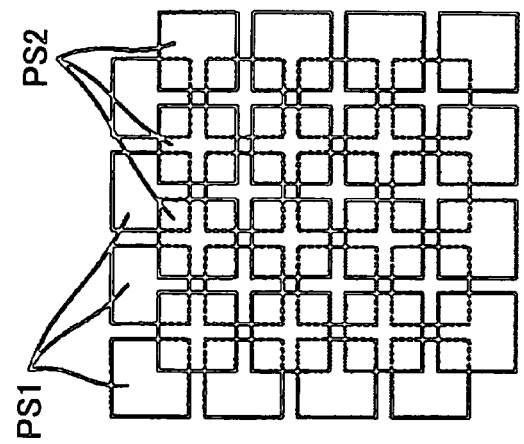
Figure 9C:
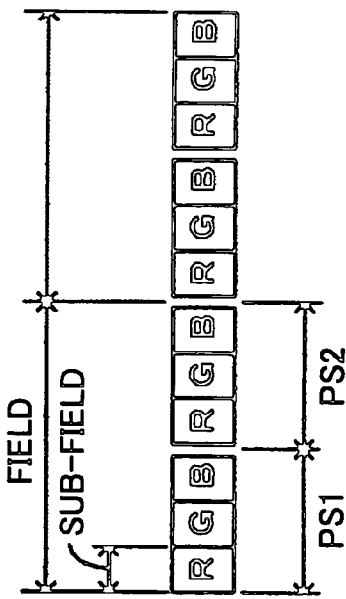

In the first pixel shift mode, as shown in FIG. 9A and FIG. 9C, one image field is divided into six sub-fields, and six polarization-color states are assigned to the six sub-fields, respectively. In order to operate a display device in this mode, in the optical device 70 as shown in FIG. 7, preferably, the color filters 73, which are arranged on the optical element 30 along the rotational direction, includes at least Red (R), Blue (B), and Green (G) three filters, and in each rotation cycle of the optical element 30, for each color of the R, G, B, polarized light beams are emitted having polarization directions perpendicular to each other. In this case, in order to prevent a so-called color breakup effect, that is, a viewer perceives a variation of the color of neighboring sub-fields through time, it is preferable that colors of neighboring sub-fields be set different.

In the second pixel shift mode, each pixel has two shift positions, and at one shift position, R, G, B colors are displayed, and at another shift position, only green color is displayed.

As shown in FIG. 9B and FIG. 9D, in the second pixel shift mode, one image field is divided into four sub-fields. In this mode, in the optical device 70 shown in FIG. 7, preferably, the color filters 73, which are arranged on the optical element 30 along the rotational direction, includes Red (R), Green (G), Blue (B), and Green (G) filters, and in each rotation cycle of the optical element 30, and each of the green filters produces polarized light beams having polarization directions perpendicular to each other.

Figure 10A:
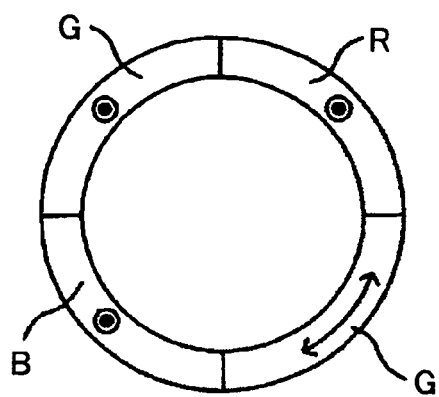
FIG. 10A through FIG. 10C are side views of the optical element 30.
Figure 10B:
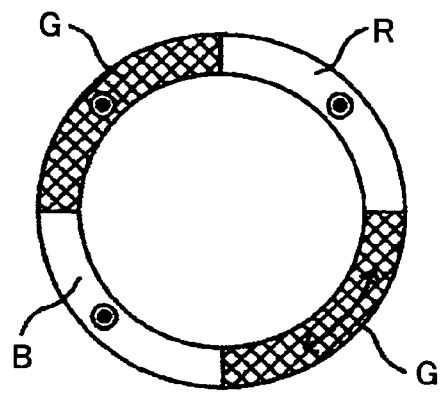
Figure 10C:
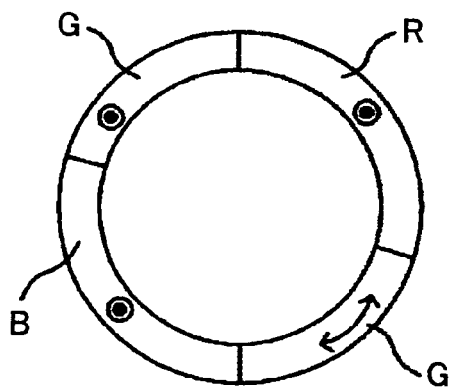

FIG. 10A through FIG. 10C are side views of the optical element 30.

As illustrated in FIG. 10A through FIG. 10C, in the optical element 30, in the Red, Green, Blue, and Green filters, polarizers are formed which have indicated polarization directions. It is preferable to set the polarization directions of the Red and Blue light beams to be the same as one of the polarization directions of one of the green light beams. Further, in order to prevent color degradation due to wavelength dispersion, it is preferable to set the polarization directions of the Red and Blue light beams to be the same as the direction of the ordinary light beam when the Red and Blue light beams transmit through the birefringent plate, which is described below.

As illustrated in FIG. 10B, transmittances of the red filter and the blue filter are set to be greater than the transmittance of the two green filters. In FIG. 10B, the two green filtering areas are shaded to indicate a small transmittance.

As illustrated in FIG. 10C, widths of the red filter and the blue filter in the rotational direction are set to be greater than the widths of the two green filters.

Due to these configurations, good color matching is obtainable.

Figure 11:
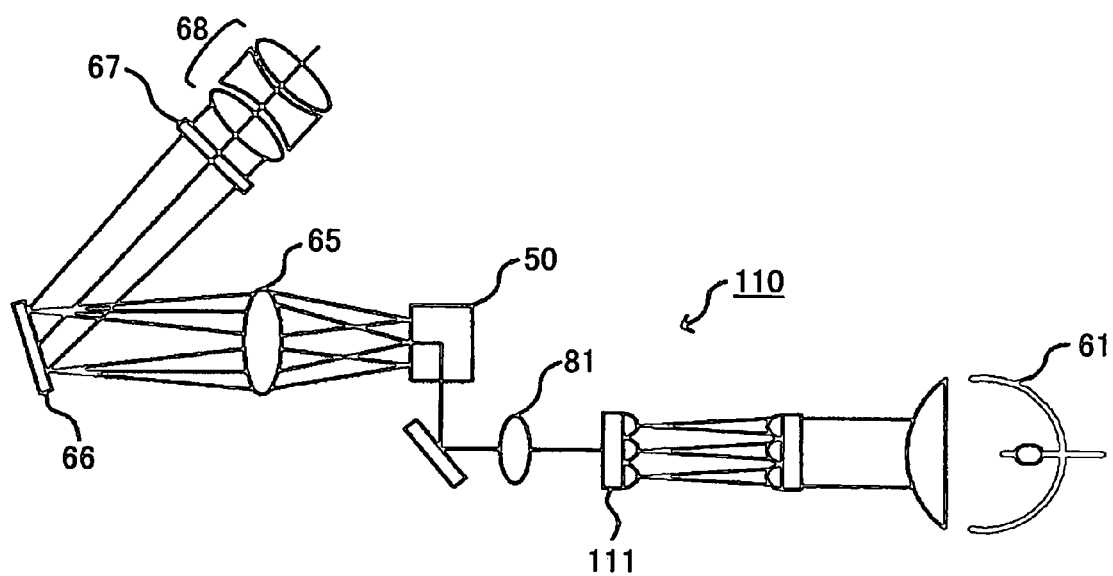
FIG. 11 is a diagram schematically illustrating another example of a display device according to the present embodiment.

FIG. 11 is a diagram schematically illustrating another example of a display device according to the present embodiment.

FIG. 11 illustrates a display device 110, which is a projection display device including the optical device 50. In the optical system of the display device 110, a polarization conversion element 111 is provided instead of the rod integrator 64 in FIG. 6 and FIG. 8 to allow polarization control of the light beam incident into the optical device 50. For example, the polarization conversion element 111 can control polarization states of the light beam so that a linear-polarized light beam or a circular-polarized light beam is incident on the optical device 50.

In addition, the optically anisotropic medium in the optical device 50 is formed from ½ wave plates arranged at certain intervals along the rotational direction of the optical element. The slow axis of the ½ wave plate is inclined by a certain angle relative to the polarization direction of the incident linear-polarized light beam, and due to this, linear-polarized light beam having an arbitrary polarization direction can be extracted.

Preferably, along the rotational direction of the optical element, an optically isotropic medium is provided between each two neighboring ½ wave plates, and the optical path length in the optically isotropic medium is equal to the optical path length in the ½ wave plates with respect to the incident light beam transmitting through the ½ wave plates.

Due to such a configuration, when the light beam transmits through the isotropic medium, the polarization state is unchanged, but when the light beam transmits through the ½ wave plates, the polarization state is changed. In addition, because the optical path length in the optically isotropic medium is equal to the optical path length in the ½ wave plate, the imaging position does not change.

Further, preferably, the transmittance of the optically isotropic medium is equal to the transmittance of the ½ wave plate with respect to the incident light beam. Thus, it is possible to maintain the color balance.

It is preferable that the transmittance at different wave length is the same, and it is more preferable that green light has the same transmittance in a projection display device.

Preferably, the optically anisotropic medium may also be formed by ¼ wave plates arranged at preset intervals along the rotational direction of the optical element. Further, if the incident light is a circular-polarized light beam, and ¼ wave plates having different phase directions are arranged alternately along the rotational direction of the optical element, it is possible to extract linear-polarized light beams having perpendicular polarization directions.

In addition, similar to the linear polarizer, the ½ wave plate or the ¼ wave plate can be combined with color filters. Further, when combining the ½ wave plate or the ¼ wave plate with the polarization conversion element, it is possible to obtain an optical device able to generate a linear-polarized light beam whose polarization direction is switched in time order.

Figure 12:
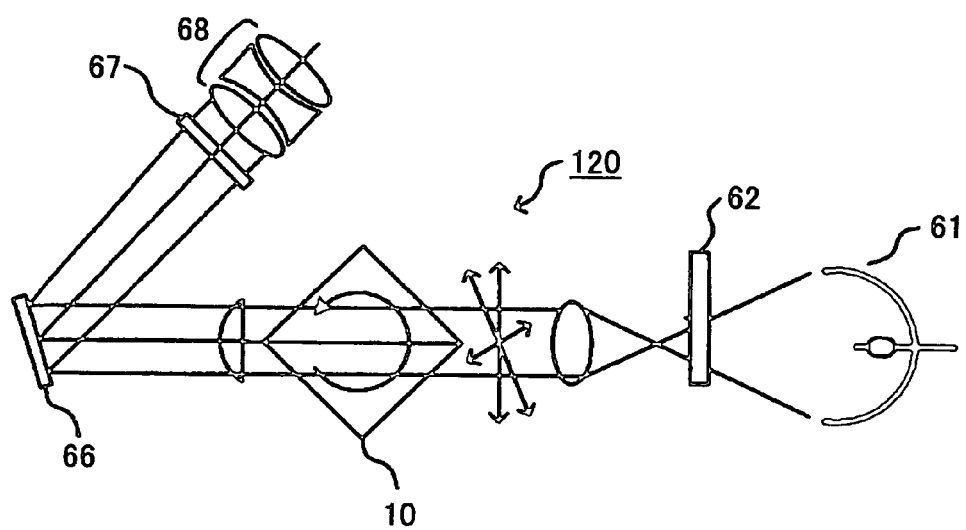
FIG. 12 is a diagram schematically illustrating another example of the display device according to the present embodiment.

FIG. 12 is a diagram schematically illustrating another example of the display device according to the present embodiment.

A display device 120 illustrated in FIG. 12 is a projection display device including the optical element 10. In the display device 120, when a light beam transmits the optical element 10 in the display device 120, the light beam transmits the optical anisotropic medium twice. As described above, the optical element 10 is the quadrangular prism shown in FIG. 1.

In FIG. 12, by appropriately adjusting the power of a condenser lens at the latter stage of the optical device 120, the polarization direction of the illuminating light incident on an image display unit changes sequentially from an upward direction to a downward direction.

Figure 13A:
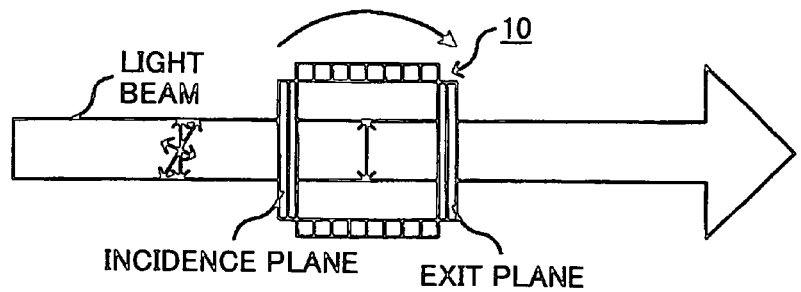
FIG. 13A through FIG. 13C are diagrams schematically illustrating operations of the display device 120.
Figure 13B:
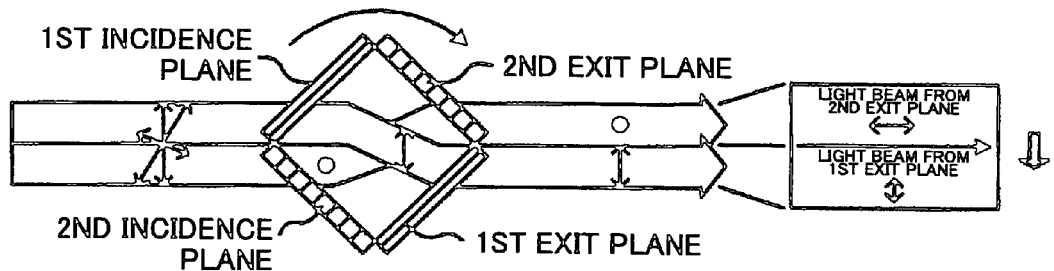
Figure 13C:
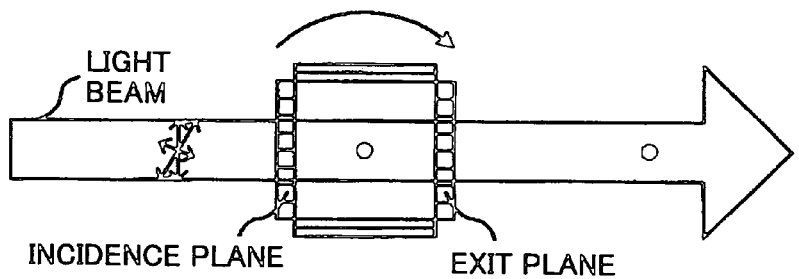

FIG. 13A through FIG. 13C are diagrams schematically illustrating operations of the display device 120 when a light beam transmits through the optical element 10 of the optical device 50 in the display device 120.

In FIG. 13A through FIG. 13C, it is assumed that the incident light beam is not polarized, and propagates from the left side to the right side.

As shown in FIG. 13A through FIG. 13C, the optical element 10 is located on the light path and is rotating.

In the state shown in FIG. 13A, polarizers, which are at an incidence plane and an exit plane of the incident light beam, respectively, are perpendicular to the optical axis, and the whole light beam is incident on a single plane (the incidence plane), and is emitted from a single plane (the exit plane). If polarizers having a vertical transmission axis are placed at the incidence plane and the exit plane, respectively, the light beam emitted from the optical element 10 is a linear-polarized light beam polarized in the vertical direction.

In the state shown in FIG. 13C, similarly, the light beam emitted from the optical element 10 is a linear-polarized light beam polarized in the horizontal direction.

In the state shown in FIG. 13B, both the incidence plane and the exit plane include two planes.

On the first incidence plane, a polarizer has a vertical transmission axis is provided, and this polarizer only allows a vertically-polarized light beam to pass through. This vertically-polarized light beam is refracted by a transparent part inside a polygonal polarization filter, and is directed to the first exit plane. On the first exit plane, there is provided a polarizer allowing the vertically-polarized light beam to transmit (same as the polarizer on the first incidence plane), the outgoing light beam from the first exit plane only has a vertically-polarized light component.

On the second incidence plane, a polarizer has a horizontal transmission axis is provided, and this polarizer only allows a horizontally-polarized light beam to pass through. Similarly, this horizontally-polarized light beam is refracted by the transparent part inside the polygonal polarization filter, and is directed to the second exit plane. On the second exit plane, there is provided a polarizer allowing the horizontally-polarized light beam to transmit (same as the polarizer on the second incidence plane), the outgoing light beam from the second exit plane only has a horizontally-polarized light component.

In the above, it is assumed that a non-polarized light beam is incident on the polygonal polarization filter, but the polygonal polarization filter can be used even when a linear-polarized light beam is incident.

Figure 14:
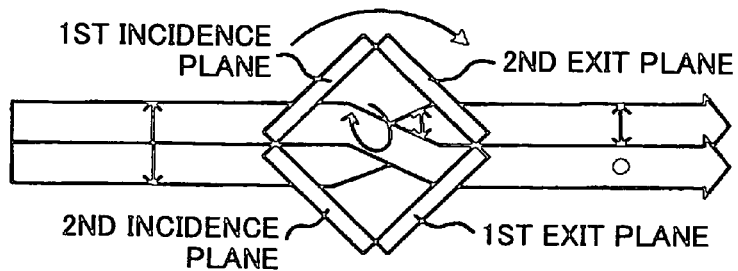
FIG. 14 is a diagram schematically illustrating operations of the display device 120.

FIG. 14 is a diagram schematically illustrating operations of the display device 120 when a linear-polarized light beam transmits through the optical element 10 of the optical device 50 in the display device 120.

In FIG. 14, as the optically-anisotropic medium, a ¼ wave plate is provided on each of the first incidence plane and the first exit plane, and an optically-isotropic medium, which has a transmittance comparable to that of the ¼ wave plate, is provided on each of the second incidence plane and the second exit plane.

Therefore, a light beam incident on the first incidence plane is converted into a circular-polarized light beam in the optical element 10, and after transmitting through the first exit plane, the circular-polarized light beam becomes a linear-polarized light beam, whose polarization plane is at 90° relative to the polarization plane of the incident light beam.

The light beam incident on the second incidence plane is not changed in the polarization state, and it is directly emitted from the second exit plane.

A polarization conversion element is well known in the related art for converting non-polarized light from a lamp or other light sources to a linear-polarized light beam, and the polarization conversion element can be used in the projection display device of the present embodiment.

Figure 15A:
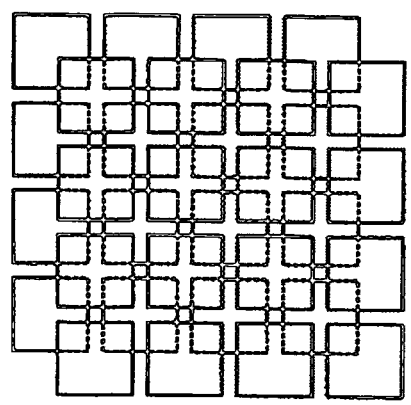
FIG. 15A and FIG. 15B illustrate the direction and position of pixel shift.
Figure 15B:
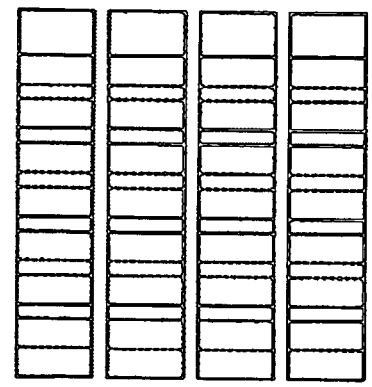

FIG. 15A and FIG. 15B illustrate the direction and position of pixel shift.

In FIG. 15A, the direction of the pixel shift is along a diagonal direction of pixels in the digital micro-mirror device. In this case, the polarization direction of the light beam, which is emitted from the optical element and incident on the digital micro-mirror device with the polarization direction thereof being switched in time order, is perpendicular to or parallel to the diagonal direction of pixels of the digital micro-mirror device.

In FIG. 15B, the direction of the pixel shift is along a side direction of pixels in the digital micro-mirror device. In this case, the polarization direction of the light beam, which is emitted from the optical element and incident on the digital micro-mirror device with the polarization direction thereof being switched in time order, is perpendicular to or parallel to the side direction of pixels of the digital micro-mirror device.

Due to this, it is possible to shift a pixel to compensate for a space between neighboring scanning lines in the vertical direction and horizontal direction, and thus, it is possible to obtain a high resolution efficiently.

For example, while 720 scanning lines are specified in the D4 standard for HDTV, even when the number of pixels of DMD in the sub-scanning direction is reduced to half, namely, 360 scanning lines, by the pixel shift, it is possible to obtain images having quality equivalent to 720 scanning lines.

Figure 16A:
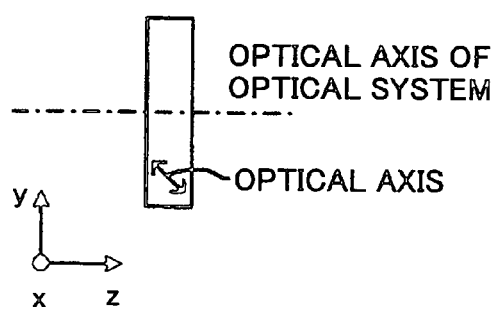
FIG. 16A and FIG. 16B are diagrams illustrating a birefringent element used in the present embodiment.
Figure 16B:
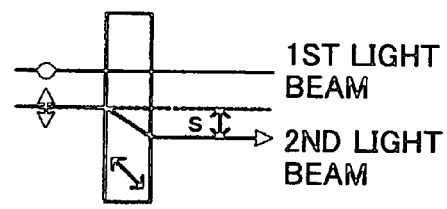

FIG. 16A and FIG. 16B are diagrams illustrating a birefringent element used in the present embodiment.

As illustrated in FIG. 16A, the birefringent element has an optical axis inclined relative to the optical axis of the optical system. It should be noted that the optical axis of the birefringent element is illustrated to be perpendicular to the surface of the birefringent element for simplicity.

As illustrated in FIG. 16B (in terms of the coordinate system shown in FIG. 16A), when the polarization direction of a first light beam is in the x direction, that is, the polarization direction of the first light beam is perpendicular to the plane including the optical axis of the birefringent element and the optical axis of the optical system, the first light beam behaves as ordinary light and propagates straight in the birefringent element.

When the polarization direction of a second light beam is in the y direction, that is, the polarization direction of the second light beam is parallel to the plane including the optical axis of the birefringent element and the optical axis of the optical system, the second light beam behaves as extraordinary light and propagates straight in the birefringent element.

When the polarization direction of the light beam is in other directions, there arise a straight propagating light component and a deflected light component. Therefore, by switching, in time order, the polarization direction of the light beam, which is emitted from the optical element and is incident on the birefringent element, between the direction perpendicular to the plane including the optical axis of the birefringent element and the optical axis of the optical system, and the direction parallel to the same plane, it is possible to control the straight propagating light component and the deflected light component.

Preferably, the shift s of the extraordinary light equals half of a pitch of the DMD pixel matrix, thereby, the space between two pixels is equally compensated for, it is possible to obtain images of high quality.

For example, the birefringent element may be formed from materials exhibiting large first-order electro-optic effect (Pockels effect), such as, $KH_2PO_4$ (KDP), $NH_4H_2PO_4$ (ADP), $LiNbO_3$, $LiTaO_3$, GaAs, CdTe, and the like, or materials exhibiting large second-order electro-optic effect, such as, KTN, SrTiO3, CS2, nitrobenzene, and the like.

FIG. 17 shows a time chart exemplifying a DMD driving signal and time allocation within one field of a polarization state in the optical device of the present embodiment.

As illustrated in FIG. 17, the display switching timing is in synchronization with the polarization state switching timing of the optical element, this can prevent degradation of image quality. For example, in order to achieve the synchronization, an optical detection mark can be formed at a specified position of the optical element, and light reflected from the mark can be detected to obtain a synchronization signal, and with this synchronization signal, the above-mentioned synchronization can be achieved.

Figure 18:
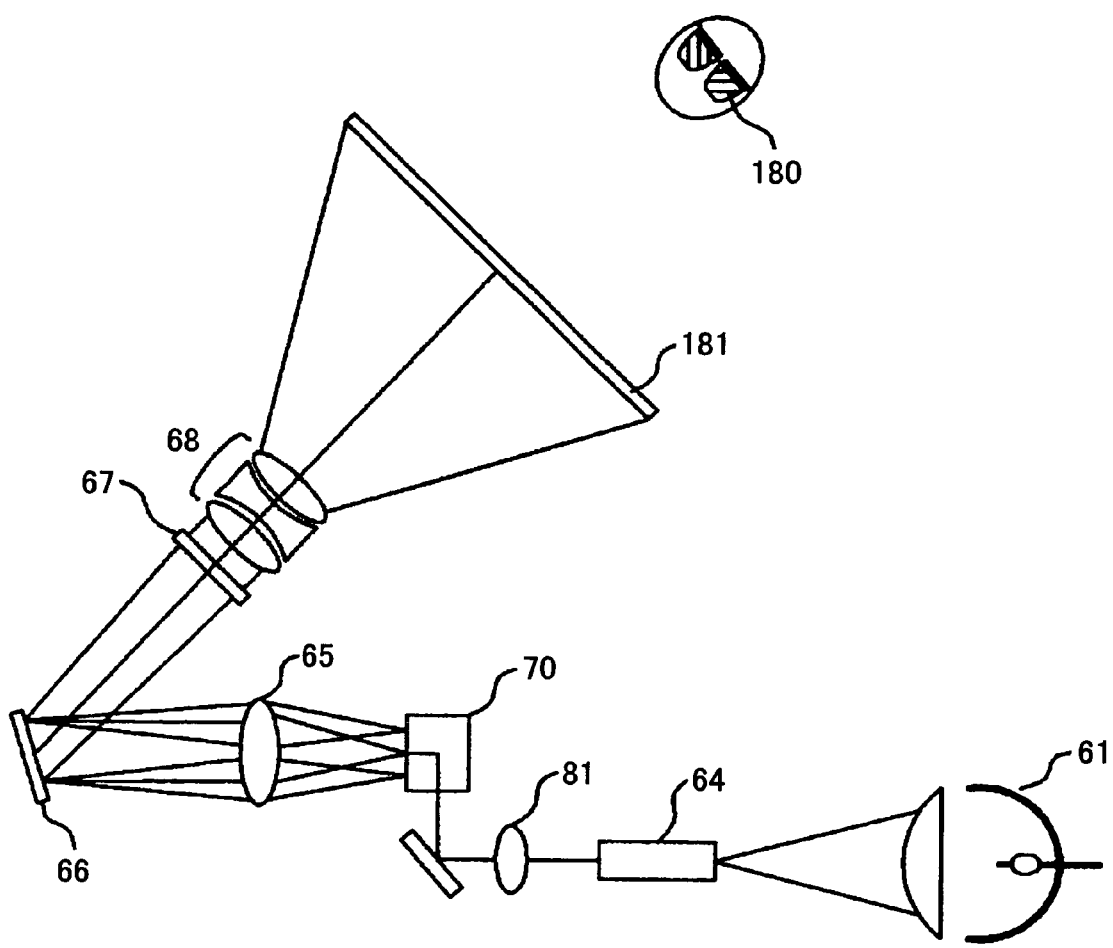
FIG. 18 is a diagram schematically illustrating an example of a three-dimension image display device according to the present embodiment.

FIG. 18 is a diagram schematically illustrating an example of a three-dimension image display device according to the present embodiment.

The three-dimension image display device illustrated in FIG. 18, for example, uses the projection display device as shown in FIG. 8.

From the projection display device, by the optical element in the optical device 70, linear-polarized light beams having polarization directions perpendicular to each other are alternately emitted within one frame.

A polarization selection unit 180 is provided, which includes polarization filters arranged corresponding to the left eye and the right eye of a viewer, respectively. The polarization filters have a transmission axis in agreement with the polarization directions of the linear-polarized light beams. Thereby, the linear-polarized light beams can be independently viewed by the right eye or by the left eye of the viewer.

As shown in FIG. 18, the polarization selection unit 180 is in form of glasses worn by the viewer. The polarization filters are arranged corresponding to the glasses for the left eye and the right eye of the viewer.

Figure 19:
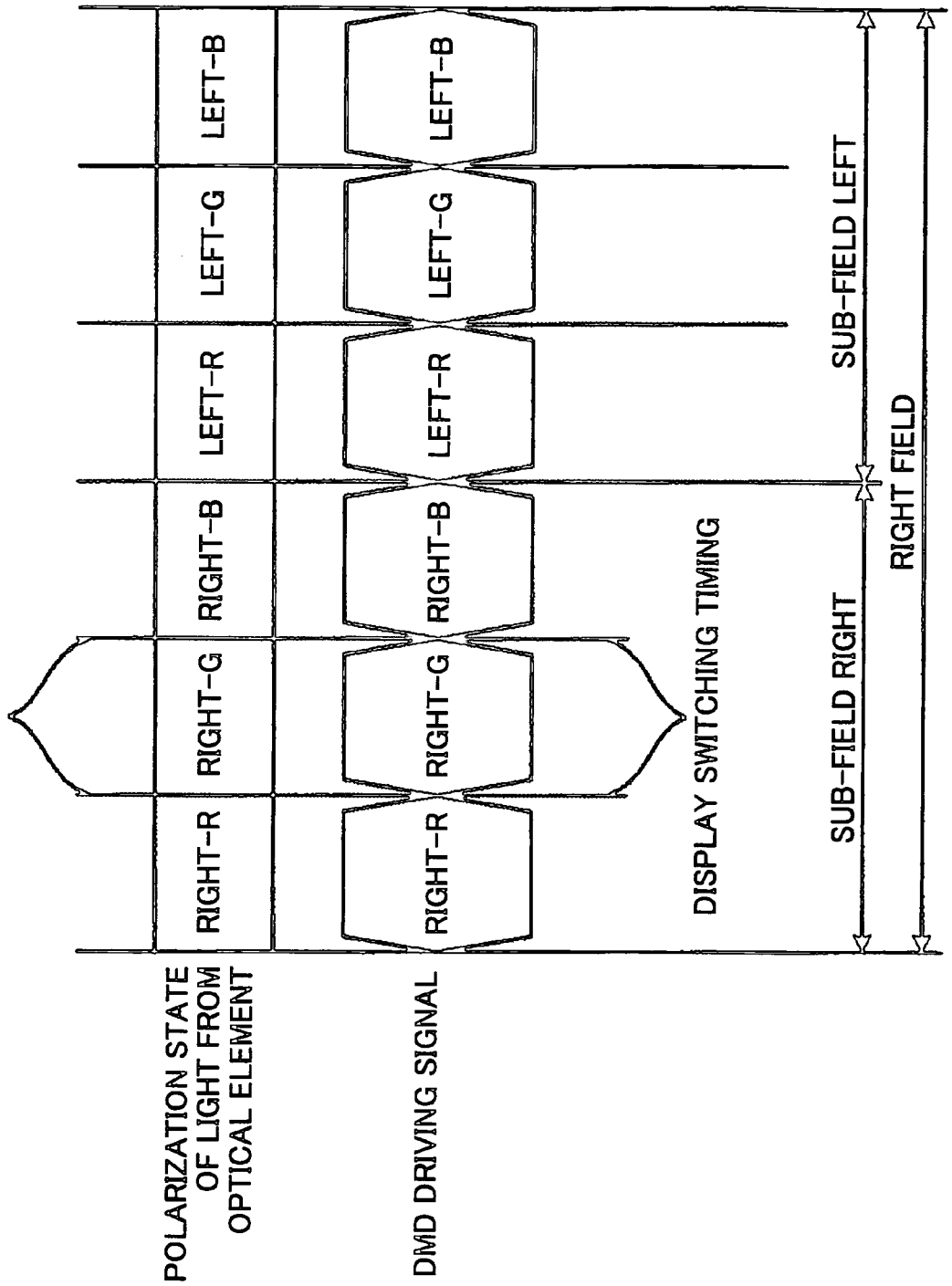
FIG. 19 shows a time chart exemplifying a DMD driving signal and time allocation within one field of a polarization state in the three-dimension image display device in FIG. 18.

FIG. 19 shows a time chart exemplifying a DMD driving signal and time allocation within one field of a polarization state in the three-dimension image display device in FIG. 18.

As illustrated in FIG. 19, the display switching timing is in synchronization with the polarization state switching timing of the optical element, this can prevent degradation of image quality.

Figure 20:
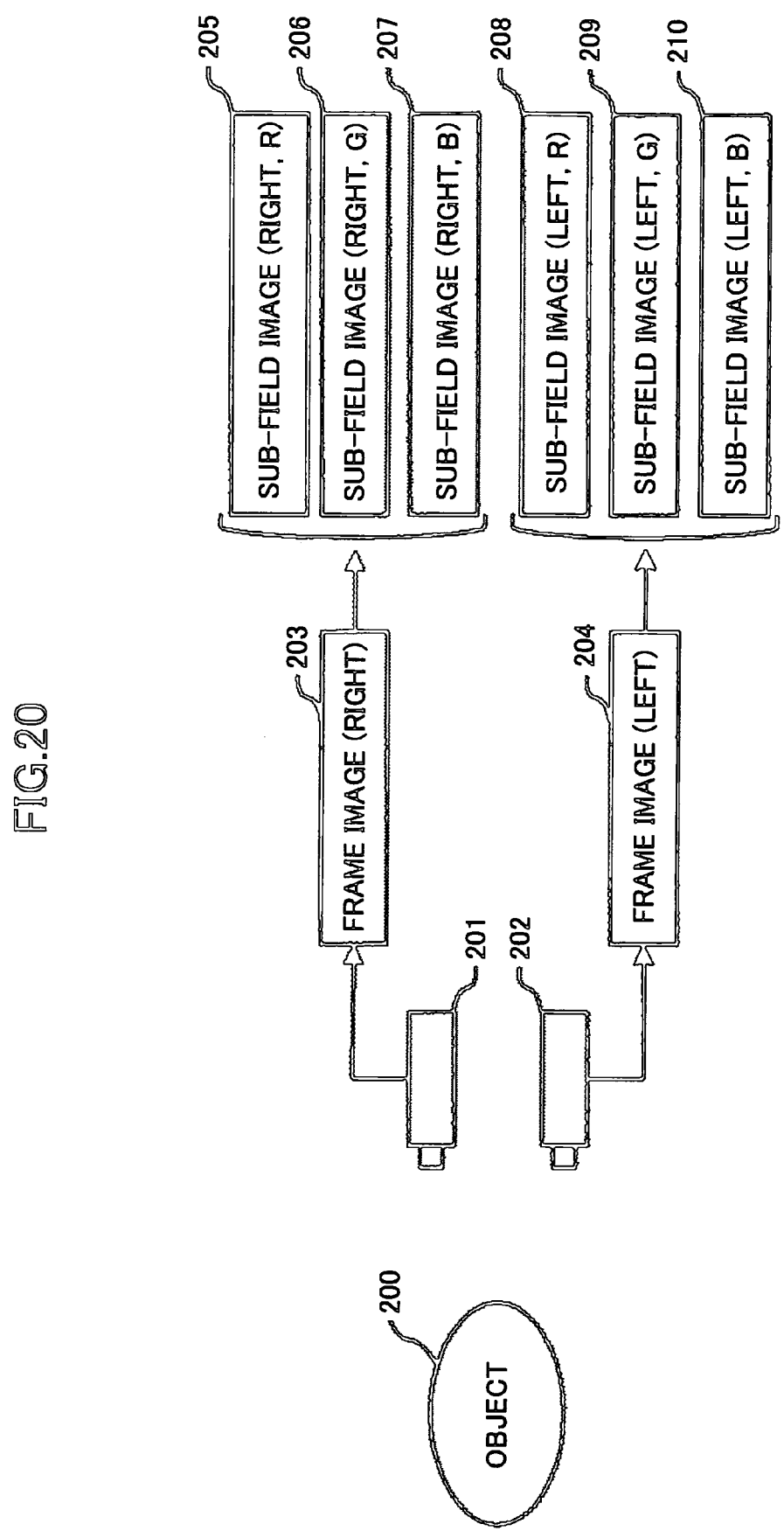
FIG. 20 is a diagram showing three-dimension image signals obtained by two cameras and to be input to a DMD.

FIG. 20 is a diagram showing three-dimension image signals obtained by two cameras and to be input to a DMD.

As shown in FIG. 20, two cameras 201 and 202, which correspond to the left eye and the right eye, respectively, are used to shoot an object 200, and the thus obtained images can be used as the three-dimension image signals to be input to the DMD. Frame images 203 and 204 obtained by the cameras 201 and 202 at the same timing are decomposed into Red (R), Green (G), and Blue (B) images, resulting in six sub-field images 205 through 210.

The polarization directions and colors of the light beams emitted from the optical element of the optical device in FIG. 18 are as indicated in FIG. 19, for example, in the order of "right R"→"left G"→"right B"→"left R"→"right G"→"left B". In accordance with this order, three-dimension image signals corresponding to six sub-field images are transmitted to the DMD 66 in FIG. 18. Due to this, three-dimension color images can be viewed by the right eye or by the left eye of the viewer within one filed.

It is preferable that the polarization directions and colors of the light beams related to neighboring sub-field images be set different in order to avoid flicker.

It should be noted that a three-dimension image display device can be constructed even without the polarization selection unit 180 in FIG. 18.

For example, a lenticular screen is used as the screen 181 in FIG. 18, and a polarization plate series, which includes polarization filters perpendicular to each other and arranged like a stripe, is provided in the lenticular screen, further, the lenticular screen is designed such that light transmitting one side of the stripe is directed to the right eye, and light transmitting the other side of the stripe is directed to the left eye. In addition, because the polarization direction of the light beam emitted from the DMD 66 is switched in time order by the optical element in the optical device 70, the light passing through the stripe-like polarization filter is blocked alternately. Therefore, by switching the images of the DMD 66 in correspondence to the eye to which the un-blocked light is directed, images for the right eye and for the left eye can be formed independently, thus, three-dimension images can be formed. However, with this method, because light intensity is largely reduced in the polarization plate series, light utilization efficiency is low.

Second Embodiment

Figure 21:
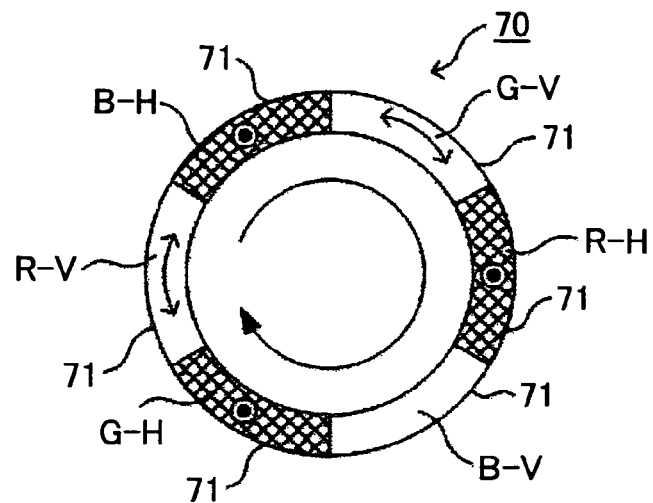
FIG. 21 is a cross sectional view of an optical element according to a second embodiment of the present invention.

FIG. 21 is a cross sectional view of an optical element according to a second embodiment of the present invention.

As illustrated in FIG. 21, in an optical element 70, a number of polarizers 71 are arranged alternately, which have transmission axes in the vertical (V) direction and in the horizontal (H) direction, and Red, Green, and Blue color filters are on the polarizers 71 in order, thus resulting in six combinations of polarization directions and colors. These color filters and polarizers 71 are arranged along the circumferential region of the optical element 70. The structure including the color filters and the polarizers 71 forms an optically anisotropic medium of the optical element 70.

When the optical element 70 is rotated, the outgoing light beam from the optical element 70 changes in polarization-color state thereof through time among the following ones, that is, a vertically-linear-polarized red light beam (indicated as "R-V"), a horizontally-linear-polarized green light beam (indicated as "G-H"), a vertically-linear-polarized blue light beam (indicated as "B-V"), a horizontally-linear-polarized red light beam (indicated as "R-H"), a vertically-linear-polarized green light beam (indicated as "G-V"), and a horizontally-linear-polarized blue light beam (indicated as "B-H").

Below, a structure including a color filter and a polarizer is referred to as a "color-polarization filter".

Figure 22:
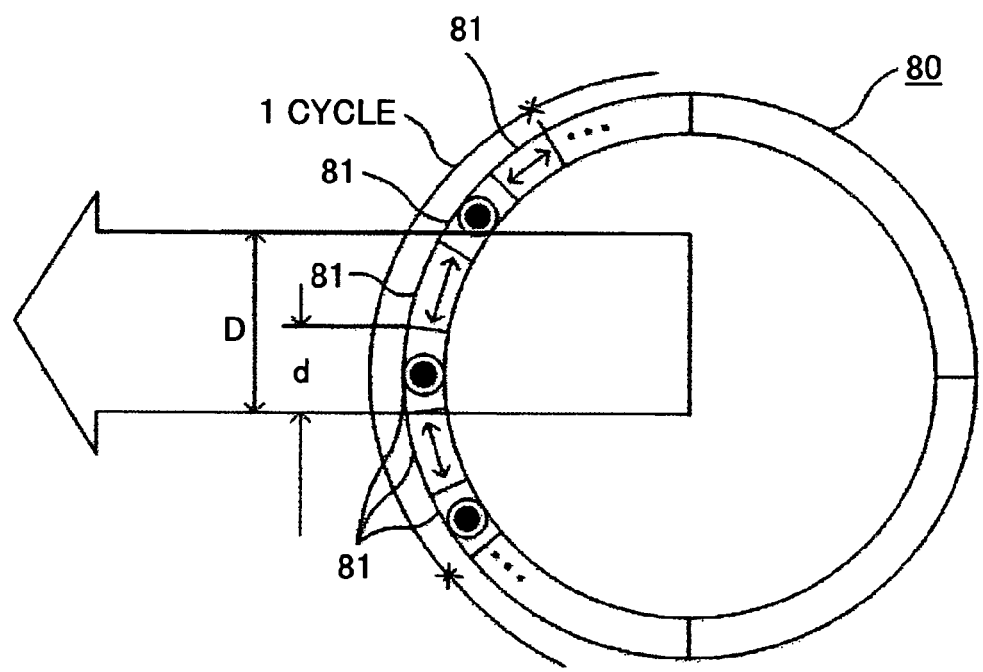
FIG. 22 is a cross sectional view of another example of the optical element according to the present embodiment of the present invention.

FIG. 22 is a cross sectional view of another example of the optical element according to the present embodiment of the present invention.

In an optical element 80 as illustrated in FIG. 22, an arrangement of six color-polarization filters 81 constitutes one cycle, and plural cycles are provided in the optical element 80.

In this case, by setting the width D of the light beam transmitting the optical element 80 to be greater than the width d of one color-polarization filter 81, the light beam can pass through two or more color-polarization filters 81.

Figure 23:
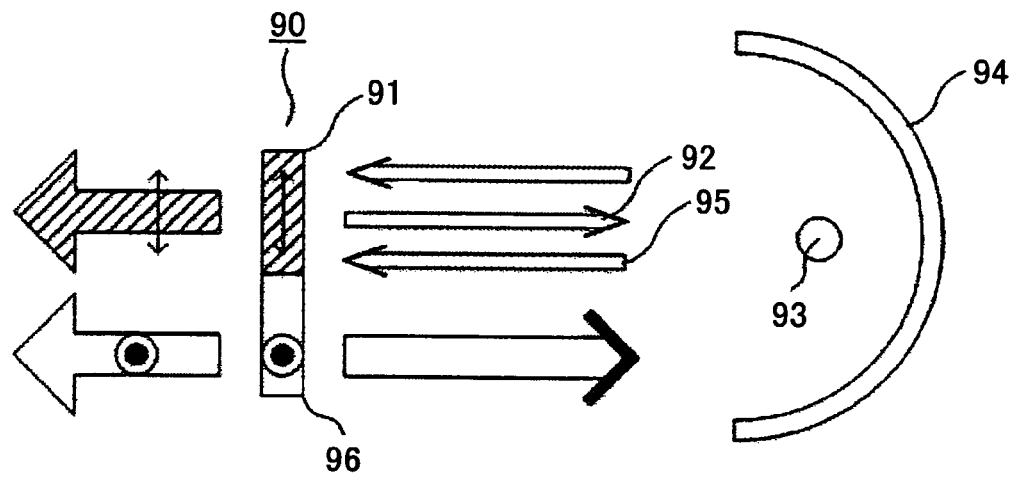

FIG. 23 is a cross sectional view of an optical element using two color-polarization filters which different light beams transmit through.

In FIG. 23, it is assumed that a R-V color-polarization filter 91, that is, a color-polarization filter which allows the R-V light beam to transmit, reflects light beams other than the R-V light beam. The light beams other than the R-V light beam are collectively represented by a reference number 92.

The light beam 92 is reflected by the R-V color-polarization filter 91, for example, the reflected light is directed to a re-collector 94, which is a reflecting plate of a light source 93, and is further reflected on the re-collector 94, the reflected light 95 is returned to an optical element 90. When the reflected light 95 arrives at other color-polarization filters than the R-V color-polarization filter, for example, a G-H color-polarization filter, a G-H light component can transmit the G-H color-polarization filter.

In this way, because the optical element of the present embodiment is able to reflect light beams other than a predetermined light beam, the light intensity wasted in the related art can be re-used, thereby, increasing light utilization efficiency.

Preferably, the color-polarization filter is formed by combining a wire-grid polarizer and an interference filter, which is superior in reflectivity and transmittance capability. Specifically, the wire-grid polarizer allows a polarized light component perpendicular to the wire to pass through, and reflects a polarized light component parallel to the wire. Further, the interference filter allows a light component in a predetermined wavelength region to pass through, and reflects other wavelength light components. In addition, the light source emits white light, from the point of view of light utilization and luminous distribution, it is preferable that R, G, B light has the same area ratio.

Figure 24:
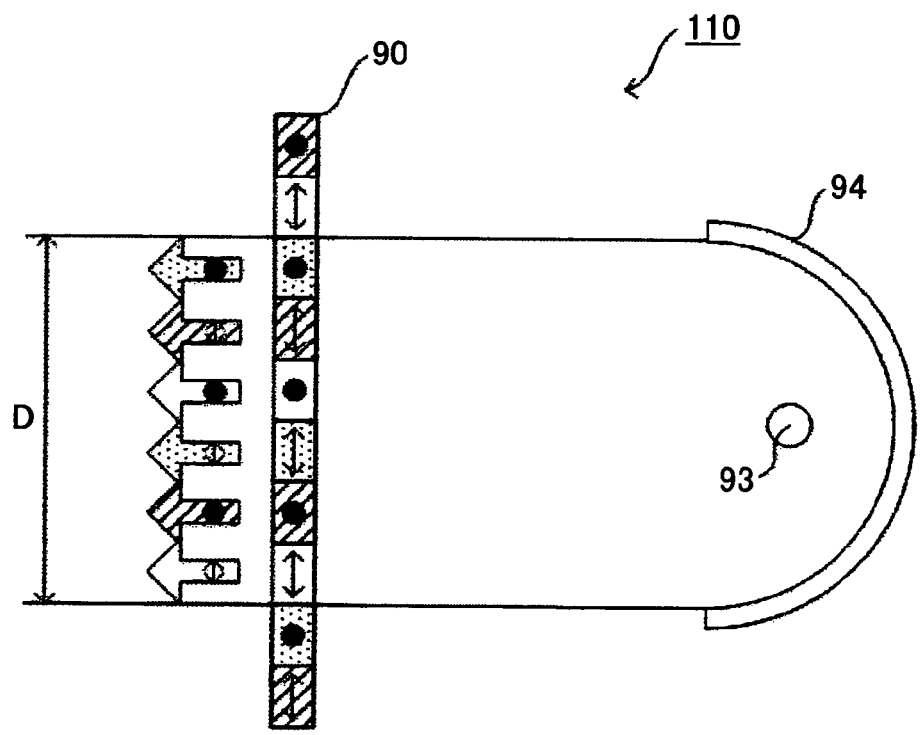
FIG. 24 is a cross sectional view of an optical device using the optical element of the present embodiment.

FIG. 24 is a cross sectional view of an optical device using the optical element of the present embodiment.

In an optical device 110 shown in FIG. 24, for example, the width D can be defines as below, $$D = d_{R\text{-}H} + d_{G\text{-}H} + d_{B\text{-}H} + d_{R\text{-}V} + d_{G\text{-}V} + d_{B\text{-}V}$$

Here, $d_{R\text{-}H}$, $d_{G\text{-}H}$, $d_{B\text{-}H}$, $d_{R\text{-}V}$, $d_{G\text{-}V}$, and $d_{B\text{-}V}$ are widths of the R-H, G-H, B-H, R-V, G-V, B-V color-polarization filters, respectively.

It is not preferable that the area ratio change with time, because when the area ratio changes with time, the transmittance per unit area increases in a small area, conversely, the transmittance per unit area decreases in a large area, and this causes fluctuation of light intensity.

Figure 25:
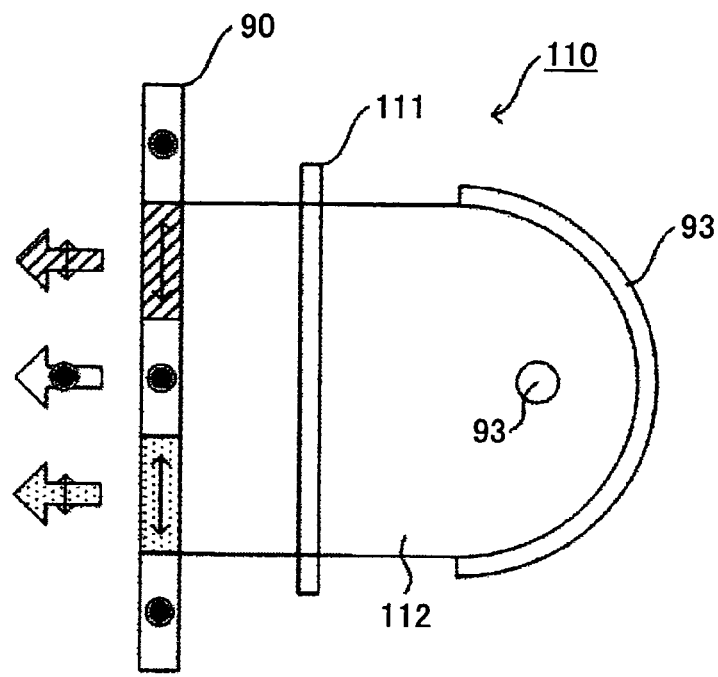
FIG. 25 is a cross sectional view of another example of the optical device using the optical element of the present embodiment.

FIG. 25 is a cross sectional view of another example of the optical device using the optical element of the present embodiment.

As illustrated in FIG. 25, the polarization plane of light 110 reflected from an optical element 90 is rotated appropriately by a polarization plane rotating unit 111, thereby, the width D satisfies:

$$D = d_R + d_G + d_B,$$

Here, $d_R$, $d_G$, and $d_B$ are widths of the respective color-polarization filters, and $d_R = d_{R\text{-}H} = d_{R\text{-}V}$, $d_G = d_{G\text{-}H} = d_{G\text{-}V}$, $d_B = d_{B\text{-}H} = d_{B\text{-}V}$.

Preferably, the polarization plane rotating unit 111 is a phase shifter having uniaxial optical properties.

In addition, it is preferable not to increase the color-polarization filters too much because the light transmitting the boundary of the color-polarization filters cannot be used effectively. From this point, it is preferable to adopt the optical element shown in FIG. 25 rather than the optical element shown in FIG. 24.

Figure 26:
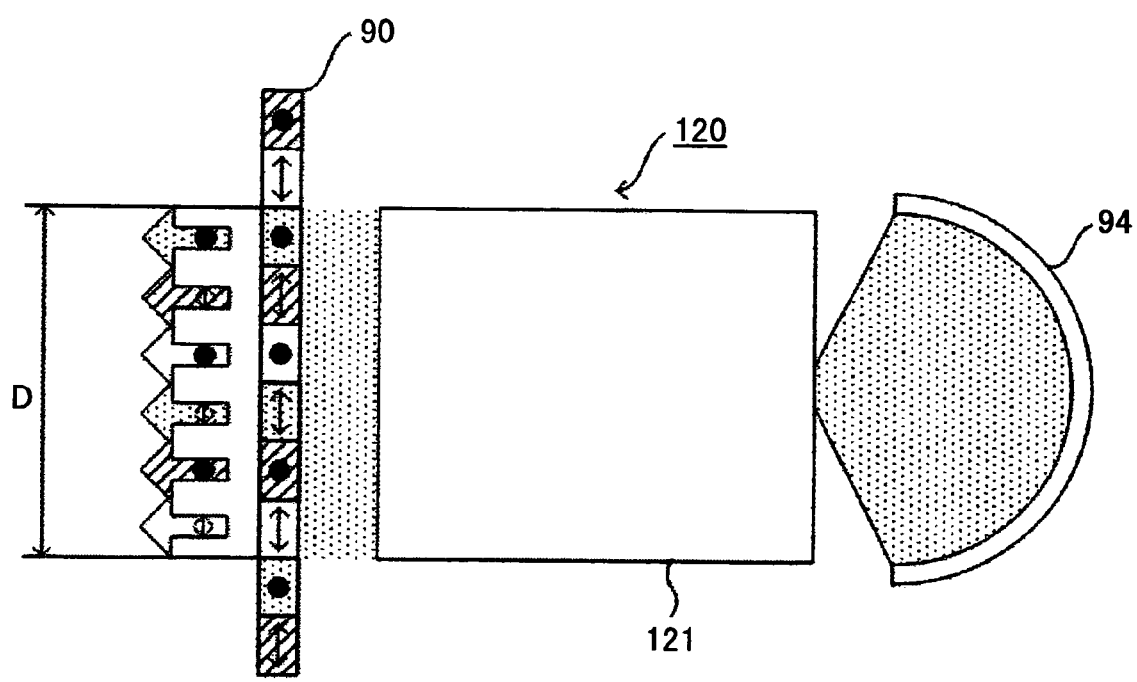
FIG. 26 is a cross sectional view of another example of the optical device using the optical element of the present embodiment.

FIG. 26 is a cross sectional view of another example of the optical device using the optical element of the present embodiment.

An optical device 120 shown in FIG. 26 includes a homogenization unit 121 between a light source and an optical element. Preferably, the homogenization unit 121 is a Kleidoscope rod integrator, with the inner side thereof being completely covered by mirrors in accordance with a width D of the exit window.

By using a rod integrator, the reflected light 92, 94 as shown in FIG. 23 does not become stray light, and can be returned back to the optical element 90 correctly. In addition, it is preferable to shorten the distance from the exit window of the Kleidoscope rod integrator to the optical element.

Figure 27:
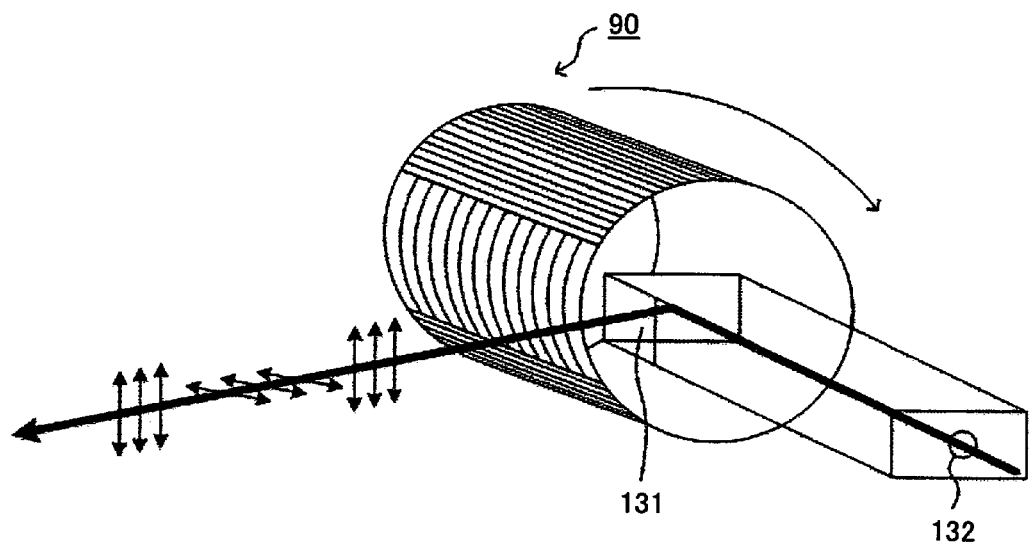
FIG. 27 is a cross sectional view of another example of the optical device using the optical element of the present embodiment.

FIG. 27 is a cross sectional view of another example of the optical device using the optical element of the present embodiment.

In order to shorten the distance from the rod integrator to the optical element, as shown in FIG. 27, the exit window 131 of the rod integrator may be arranged inside the optical element 90. Here, by "inside the optical element 90", it means the inner portion of a space formed by a translucent surface parallel to the rotational axis of the optical element 90.

Figure 28:
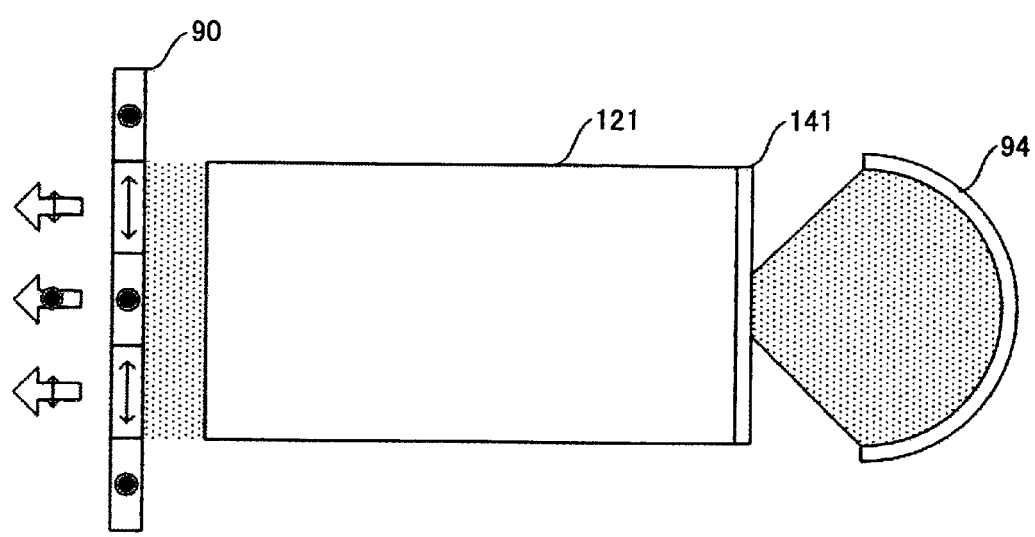
FIG. 28 is a cross sectional view of another example of the optical device using the optical element of the present embodiment.

FIG. 28 is a cross sectional view of another example of the optical device using the optical element of the present embodiment.

As illustrated in FIG. 28, a polarization plane rotating unit 141 is a phase shifter provided on an inner side of the incidence window. Due to this, light reflected from the optical element 90 is returned to the optical element 90 again while the polarization plane is being rotated. The phase can be set to correspond to half of a wavelength of green light propagating to and back. The slow axis can be set to be at 22.5° relative to the polarization direction of the polarizer in the optical element 90. Therefore, even when the light reflected from the optical element 90 is polarized, after rotating the light by 45°, the light can be treated as a non-polarized one.

Figure 29:
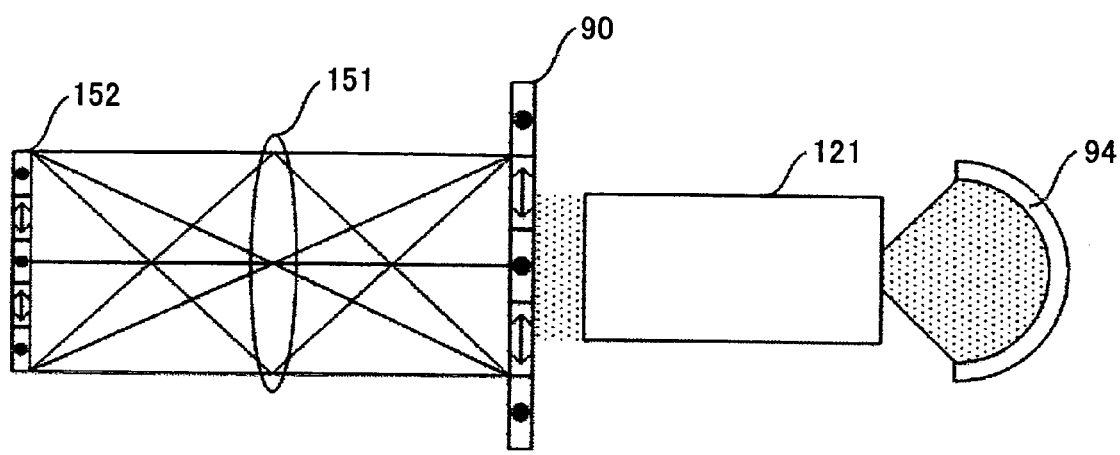
FIG. 29 is a cross sectional view of another example of the optical device using the optical element of the present embodiment.

FIG. 29 is a cross sectional view of another example of the optical device using the optical element of the present embodiment.

In an optical system of the optical device as illustrated in FIG. 29, a relay lens 151 is used to form an image of the surface of the optical element 90 on an image display unit 152.

When the optical element 90 is rotating, light beams of different colors and different polarization directions are scrolled sequentially on the image display unit 152.

Figure 30:
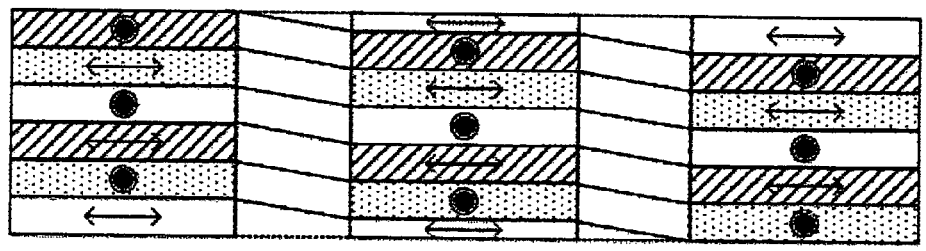
FIG. 30 is a diagram illustrating the sequential scrolling of light beams of different colors and different polarization directions on the image display unit 152.

FIG. 30 is a diagram illustrating the sequential scrolling of light beams of different colors and different polarization directions on the image display unit 152.

Figure 31:
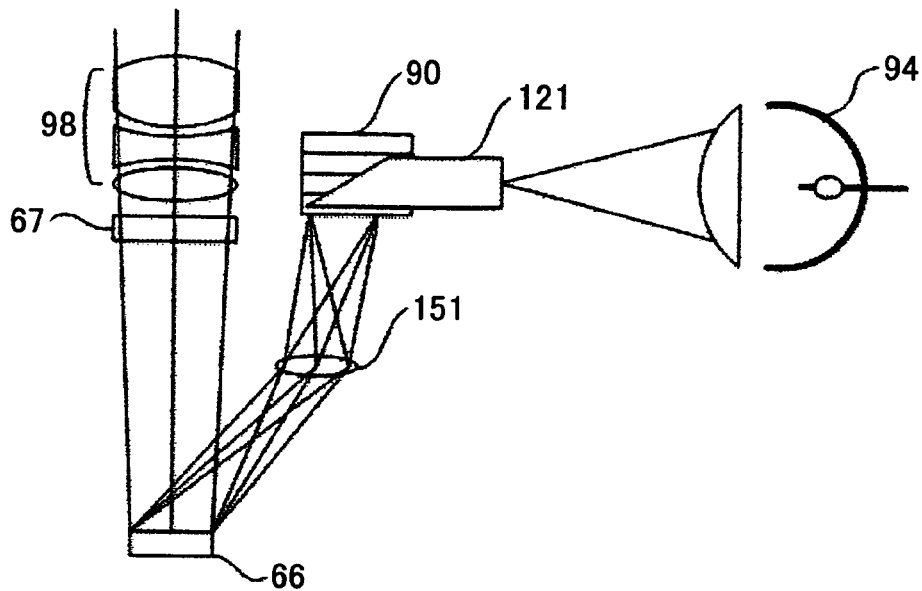
FIG. 31 is a diagram schematically illustrating a display device according to the present embodiment of the present invention.

FIG. 31 is a diagram schematically illustrating a display device according to the present embodiment of the present invention.

As illustrated in FIG. 31, because it is necessary to illuminate the DMD 66 obliquely, the light from the homogenization unit 121, which is a rod integrator, passes through the color-polarization filter in the optical element 90 at an angle relative to the rotational axis of the optical element 90.

In addition, as shown in FIG. 27, the exit window of the rod integrator, which acts as the homogenization unit 121, is arranged inside the optical element 90 to shorten the distance from the exit window of the rod integrator to the optical element 90, thereby, increasing light utilization efficiency.

Further, the exit window of the rod integrator may be arranged on a side surface, or the rod integrator itself may be folded, thereby, the optical element can be made compact. In this way, light utilization efficiency can be improved with roughly the same number of parts in the display device.

In addition, because the light beam from the optical element 90 transmits through the surface on which optically anisotropic media are formed, as shown in FIG. 30, the illuminating light, whose colors and polarization directions change with time, is emitted on the image display unit.

Focusing on one pixel of the image display unit 152 in FIG. 29, the state of the illuminating light changes in the order of R-V, G-V, B-V, R-H, G-H, and B-H. Then, pixel data signals of each color corresponding to respective pixel shift positions are transmitted in synchronization with the change of the state of the illuminating light, thereby, images of doubled resolution can be formed.

In the present embodiment, the pixel shift is executed in the first mode, as described with reference to FIG. 9A and FIG. 9C. In this mode of pixel shift, each pixel has two shift positions (PS1, PS2), and the brightness at these shift positions corresponds to R, G, B color positions.

As shown in FIG. 9A and FIG. 9C, one image field is divided into six sub-fields, and six polarization-color states are assigned to the six sub-fields, respectively. In order to operate a display device in this mode, in the optical element 90 in FIG. 29, preferably, the color filters, which are arranged on the optical element 90 along the rotational direction, includes at least Red (R), Blue (B), and Green (G) three filters, and in each rotation cycle of the optical element 90, for each color of the R, G, B, polarized light beams are emitted having polarization directions perpendicular to each other. As described above, the state of the outgoing light changes in the order of R-V, G-V, B-V, R-H, G-H, B-H.

It should be noted that the descriptions made with reference to FIG. 15A and FIG. 15B, FIG. 16A and FIG. 16B, and FIG. 17 are also applicable to the present embodiment.

Figure 32:
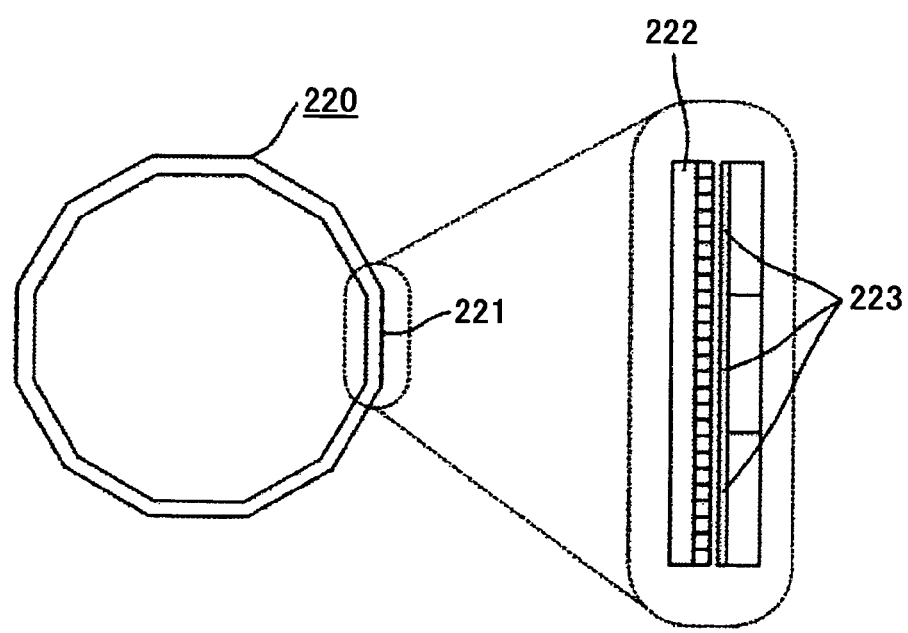
FIG. 32 is a diagram exemplifying the color-polarization filter of the present embodiment formed by combining a wire-grid polarizer and an interference filter.

FIG. 32 is a diagram exemplifying the color-polarization filter of the present embodiment, which is formed by combining a wire-grid polarizer and an interference filter.

As illustrated in FIG. 32, an optical element 220 is formed from a regular dodecahedron, and on the side surfaces 221 of the regular dodecahedron, wire-grid polarizers 222 are arranged to be adjacent to each other with the polarization direction to be alternately rotated by 90°. For example, a commercially available wire-grid polarizer (for example, product "proflux" by Moxtek Co.) can be used as the wire-grid polarizer 222.

On the wire-grid polarizers 222, R, G, B the interference filters 223 are arranged following the sequence of R-V, G-V, B-V, R-H, G-H, B-H, and there are totally six sequences. Again, the interference filter 223 may also be commercially available ones, for example, products by Melles Griot Co. can be used.

Alternatively, the wire-grid polarizer 222 and the interference filter 223 may be formed on respective transparent substrates, separately, and then transparent substrates are bonded with an adhesive agent with the wire-grid polarizer 222 and the interference filter 223 on the inner side. In this way, the stray light component can be reduced.

In the display device of the present embodiment, the illumination optical system includes a lamp unit having a high-pressure mercury lamp and a parabola mirror, the above rod integrator, and the above optical element. The incidence window of the rod integrator is placed near a focus point of the light from the lamp unit. On the inner side of the incidence window, there is arranged a phase shifter formed from a dichroic filter, which acts as a polarization plane rotating unit. The exit window of the rod integrator, as shown in FIG. 27, is arranged near the color-polarization filter of the optical element. The shape of the exit window is similar to the image display element. In order to reduce the cost, surfaces of the rod integrator can be formed by aluminum mirrors.

According to the display device of the present embodiment, the light utilization efficiency is over 80%, much higher than the related art.

Alternatively, the display device shown in FIG. 31 can also be constructed by a relay lens in the illumination system, a DMD image display unit, and a projection lens. Because the light from the illumination system to the image display unit is obliquely incident on the image display unit, the exit direction of the rod integrator is adjusted so that the optical axis is inclined relative to the relay lens. The normal direction of the optically anisotropic media on the optical element is parallel to the normal direction of the relay lens and the image display unit.

Because the light beam transmits through the surface on which optically anisotropic media are formed, as shown in FIG. 30, the illuminating light, whose colors and polarization directions change with time, is emitted on the image display unit. Focusing on one pixel of the image display unit, the state of the illuminating light changes in the order of R-V, G-V, B-V, R-H, G-H, and B-H. Then, pixel data signals of each color corresponding to respective pixel shift positions are transmitted in synchronization with the change of the state of the illuminating light, thereby, images of doubled resolution can be formed.

In other words, when the light beam, which propagates from the DMD to the projection lens, passes through a birefringent element, it is possible to control the straight propagating light component and the polarized light component by a difference of the polarization state. With these light beams, it is possible to obtain images of high resolution. Finally, the projection lens projects the light beam onto a not-illustrated screen to display color images thereon.

Figure 33:
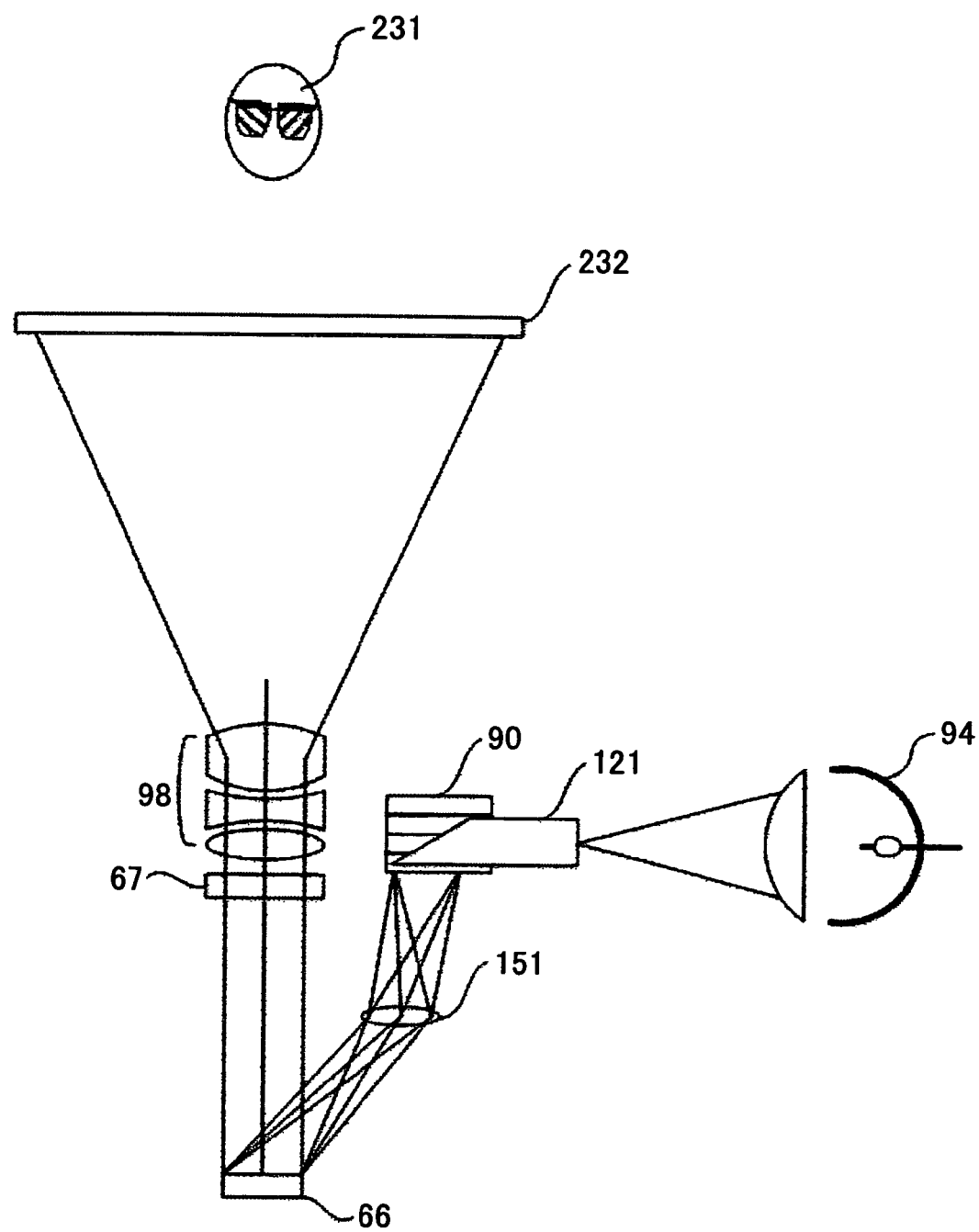
FIG. 33 is a diagram schematically illustrating a three-dimension image display device using the optical element 90 of the present embodiment.
Figure 34:
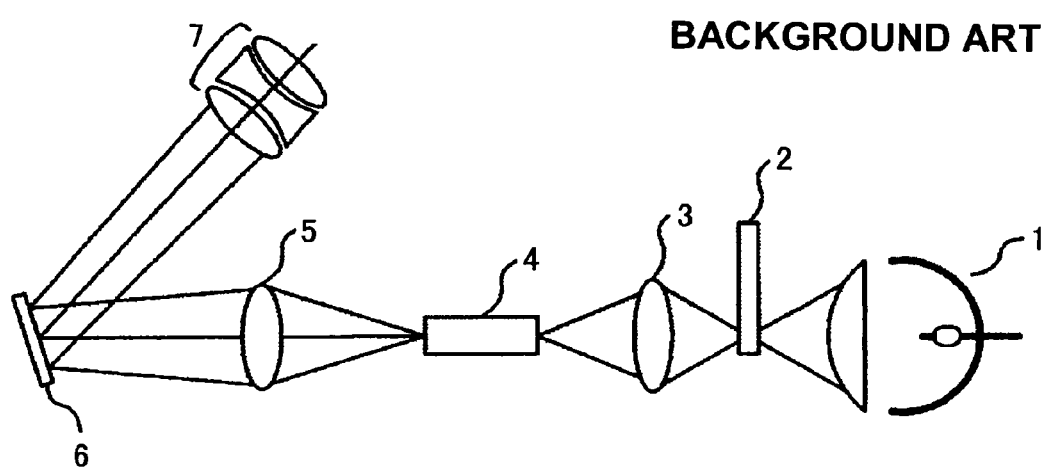
FIG. 34 is a diagram illustrating a configuration of a projection display device in the related art.
Figure 35:
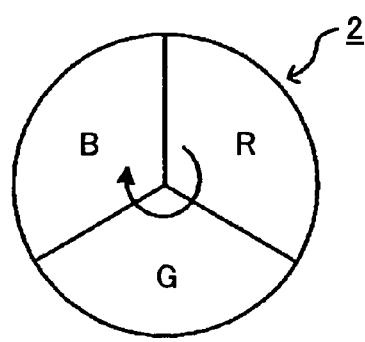
FIG. 35 is a diagram illustrating the composition of the light beam emitted from the lamp unit 1.

FIG. 33 is a diagram schematically illustrating a three-dimension image display device using the optical element 90 of the present embodiment.

The three-dimension image display device illustrated in FIG. 33, for example, uses the projection display device as shown in FIG. 31.

From the projection display device, by the optical element 90, linear-polarized light beams having polarization directions perpendicular to each other are alternately emitted within one frame. A polarization selection unit 231 is provided, which includes polarization filters arranged correspondingly to the left eye and the right eye of a viewer, respectively. The polarization filters have a transmission axis in agreement with the polarization directions of the linear-polarized light beams. Thereby, the linear-polarized light beams can be independently viewed by the right eye or by the left eye of the viewer. As shown in FIG. 33, the polarization selection unit 231 is in form of glasses worn by the viewer. The polarization filters are arranged corresponding to the glasses for the left eye and the right eye of the viewer.

While the present invention is described above with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Applications No. 2004-240237 filed on Aug. 20, 2004 and No. 2005-048403 filed on Feb. 24, 2005, and the entire contents of which are hereby incorporated by reference.

What is claimed is:

1. An optical element having a rotational axis, comprising:
   a translucent surface parallel to the rotational axis, at least a portion of the translucent surface being formed from an optically anisotropic medium,
   wherein a polarization state of a light beam incident in a predetermined direction and transmitting through the translucent surface is switched in time order along with rotation of the optical element,
   wherein the optically anisotropic medium includes ½ wave plates arranged at predetermined intervals along a rotational direction of the optical element.

2. The optical element as claimed in claim 1, wherein a cylinder is provided which has the rotational axis and the translucent surface parallel to the rotational axis, and at least a portion of the side surface of the cylinder is formed from the optically anisotropic medium.

3. The optical element as claimed in claim 1, wherein the optically anisotropic medium includes polarizers arranged at predetermined intervals along a rotational direction of the optical element.

4. The optical element as claimed in claim 3, wherein the plurality of polarizers produce outgoing light beams having different polarization directions.

5. The optical element as claimed in claim 4, wherein two types of polarizers are arranged alternately along the rotational direction of the optical element, said two types of polarizers producing light beams having perpendicular polarization directions.

6. The optical element as claimed in claim 1, wherein an optically isotropic medium is provided between each two neighboring ½ wave plates, an optical path length in the optically isotropic medium being equal to an optical path length in the ½ wave plates with respect to an incident light beam transmitting through the ½ wave plates.

7. The optical element as claimed in claim 1, wherein an optically isotropic medium is provided between each two neighboring ½ wave plates, a transmittance of the optically isotropic medium being equal to a transmittance of the ½ wave plates relative to an incident light beam transmitting through the ½ wave plates.

8. The optical element as claimed in claim 1, wherein the optically anisotropic medium includes a plurality of ¼ wave plates arranged at predetermined intervals along a rotational direction of the optical element.

9. The optical element as claimed in claim 8, wherein the ¼ wave plates having different phase directions are arranged alternately along the rotational direction of the optical element.

10. The optical element as claimed in claim 1, wherein a plurality of color filters are arranged along a rotational direction of the optical element, at least one of the color filters serving as the optically anisotropic medium.

11. The optical element as claimed in claim 10, wherein the color filters include at least a Red (R) filter, a Blue (B) filter, and a Green (G) filter, and
   in each rotation cycle of the optical element, the color filters produce polarized light having one of two perpendicular polarization states for each color and totally at least six polarization states.

12. The optical element as claimed in claim 11, wherein neighboring polarization states among the six polarization states correspond to different colors.

13. The optical element as claimed in claim 10, wherein the color filters include a Red (R) filter, a first Green (G) filter, a Blue (B) filter, and a second Green (G) filter, and in each rotation cycle of the optical element, each of the first green filter and the second green filter produces polarized light beams having polarization directions perpendicular to each other.

14. The optical element as claimed in claim 13, wherein each of red and blue polarized light beams has a polarization direction parallel to the polarization direction of one of the green polarized light beams.

15. The optical element as claimed in claim 13, wherein a transmittance of the red filter and a transmittance of the blue filter are greater than a transmittance of the first green filter and the second green filter.

16. The optical element as claimed in claim 13, wherein a width of the red filter and a width of the blue filter along the rotational direction are greater than a width of the first green filter and the second green filter.

17. An optical device comprising:
at least one optical element that includes a translucent surface parallel to a rotational axis of the optical element with at least a portion of the translucent surface being formed from an optically anisotropic medium,
wherein a light beam is incident on the optical element at a predetermined direction, and a light beam having a polarization state different from the incident light beam is emitted out, said polarization state of the outgoing light beam being switched in time order along with rotation of the optical element,
wherein the optically anisotropic medium includes ½ wave plates arranged at predetermined intervals along a rotational direction of the optical element, and
the light beam incident on the optical element is a linear-polarized light beam.

18. The optical device as claimed in claim 17, wherein an optical axis of the incident light beam passing through the optically anisotropic medium is perpendicular to the rotation axis.

19. The optical device as claimed in claim 17, wherein a straight line including an optical axis of the incident light beam transmitting through the optically anisotropic medium passes through the rotation axis of the optical element.

20. The optical device as claimed in claim 17, wherein the light beam incident on the optically anisotropic medium is a converged light beam, and a convergence point is on the optically anisotropic medium.

21. The optical device as claimed in claim 17, wherein when the incident light beam transmits through the optical element, the incident light beam transmits through the translucent surface with the optically anisotropic medium formed thereon only once.

22. The optical device as claimed in claim 21, wherein a mirror is fixed in the optical element on an optical path length of the light beam passing through the optically anisotropic medium.

23. The optical device as claimed in claim 22, wherein a propagation direction of the light beam in the optical element is along a direction from the mirror to the optically anisotropic medium.

24. The optical device as claimed in claim 21, wherein the optically anisotropic medium includes polarizers arranged at predetermined intervals along a rotational direction of the optical element; and
the light beam incident on the optical element is a non-polarized light beam.

25. The optical device as claimed in claim 21, wherein the optically anisotropic medium includes ¼ wave plates arranged at predetermined intervals along a rotational direction of the optical element; and
the light beam incident on the optical element is a linear-polarized light beam.

26. The optical device as claimed in claim 17, wherein when the incident light beam transmits through the optical element, the incident light beam transmits through the translucent surface with the optically anisotropic medium formed thereon twice.

27. The optical device as claimed in claim 17, wherein the outgoing light beam having a temporally switched polarization state is a linear-polarized light beam having one of two perpendicular polarization states.

28. A display device, comprising:
an optical device including at least one optical element which includes a translucent surface parallel to a rotational axis of the optical element with at least a portion of the translucent surface being formed from an optically anisotropic medium; and
a digital micro-mirror device,
wherein a light beam is incident on the optical element at a predetermined direction, and a light beam having a polarization state different from the incident light beam is emitted out, said polarization state of the outgoing light beam being switched in time order along with rotation of the optical element,
the light beam emitted from the optical element in the optical device is incident on the digital micro-mirror device with a polarization state of the light beam being switched in time order; and
a polarization direction of the light beam incident on the digital micro-mirror device is perpendicular to or parallel to a diagonal direction of pixels of the digital micro-mirror device.

29. The display device as claimed in claim 28, wherein the optical device is arranged on an illuminating side of the digital micro-mirror device.

30. The display device as claimed in claim 28, wherein
the light beam emitted from the optical element in the optical device is incident on the digital micro-mirror device with a polarization state of the light beam being switched in time order; and
a polarization direction of the light beam incident on the digital micro-mirror device is perpendicular to or parallel to a side direction of pixels of the digital micro-mirror device.

31. The display device as claimed in claim 28, wherein
a birefringent element is provided on an outgoing side of the digital micro-mirror device, said birefringent element having an optical axis inclined relative to an optical axis of the digital micro-mirror device.

32. The display device as claimed in claim 31, wherein
the light beam emitted from the optical element in the optical device is incident on the birefringent element with a polarization state of the light beam being switched in time order; and
a polarization direction of the light beam incident on the birefringent element is perpendicular to or parallel to a plane including the optical axis of the birefringent element and the optical axis of the digital micro-mirror device.

33. The display device as claimed in claim 32, wherein
when the polarization direction of the light beam incident on the birefringent element is parallel to the plane including the optical axis of the birefringent element and the optical axis of the digital micro-mirror device,
deflection of the light beam caused by birefringence equals half of a pitch of a pixel matrix in the digital micro-mirror device along the polarization direction.

34. The display device as claimed in claim 28, wherein a display switching timing of the digital micro-mirror device is in synchronization with the polarization state switching timing in the optical element of the optical device.

* * * * *